United States Patent
Langerbeins et al.

(10) Patent No.: US 11,332,580 B2
(45) Date of Patent: May 17, 2022

(54) CURABLE SILICONE RUBBER COMPOUNDS

(71) Applicant: NITROCHEMIE ASCHAU GMBH, Aschau/Inn (DE)

(72) Inventors: Klaus Langerbeins, Pulheim (DE); Alexis Krupp, Mühldorf (DE); Thomas Knott, Mühldorf (DE); Jörg Lippstreu, Traunstein (DE); Rüdiger Schuck, Suederhastedt (DE); Ulrich Pichl, Aschau (DE)

(73) Assignee: NITROCHEMIE ASCHAU GMBH, Aschau/Inn (DE)

( * ) Notice: Subject to any disclaimer, the term of this patent is extended or adjusted under 35 U.S.C. 154(b) by 0 days.

(21) Appl. No.: 16/606,068

(22) PCT Filed: Apr. 20, 2018

(86) PCT No.: PCT/EP2018/060217
§ 371 (c)(1),
(2) Date: Dec. 20, 2019

(87) PCT Pub. No.: WO2018/193107
PCT Pub. Date: Oct. 25, 2018

(65) Prior Publication Data
US 2020/0115503 A1  Apr. 16, 2020

(30) Foreign Application Priority Data

Apr. 21, 2017 (EP) ..................... 17167603

(51) Int. Cl.
*C08G 77/08* (2006.01)
*C08G 77/16* (2006.01)
*C08G 77/20* (2006.01)
*C09D 183/06* (2006.01)
*C09J 183/06* (2006.01)
*C09K 3/10* (2006.01)
*C08G 77/00* (2006.01)

(52) U.S. Cl.
CPC ............ *C08G 77/08* (2013.01); *C08G 77/16* (2013.01); *C08G 77/20* (2013.01); *C09D 183/06* (2013.01); *C09J 183/06* (2013.01); *C09K 3/1018* (2013.01); *C08G 77/70* (2013.01); *C08G 77/80* (2013.01); *C09K 2200/0685* (2013.01)

(58) Field of Classification Search
CPC .... C08G 77/16; C08G 77/08; C08G 77/1896; C07F 7/1804; C07F 7/1896; C09D 183/06; C09J 183/06
See application file for complete search history.

(56) References Cited

U.S. PATENT DOCUMENTS

| | | | | | |
|---|---|---|---|---|---|
| 4,410,677 | A | * | 10/1983 | Lampe | C08K 5/098 524/265 |
| 4,511,728 | A | * | 4/1985 | Kreuzer | C07F 7/045 556/419 |
| 4,517,337 | A | * | 5/1985 | Lockhart | C08K 5/57 524/859 |
| 2016/0046893 | A1 | * | 2/2016 | Zhang | C11D 3/28 510/365 |

FOREIGN PATENT DOCUMENTS

CN     105308109 A     2/2016

OTHER PUBLICATIONS

Freeman (Silicones, Published for the Plastics Institute, ILIFFE Books Ltd., 1962, p. 27).*
Search Report, dated Jun. 30, 2021, by the China National Intellectual Property Administration in application No. 201880037333.8.

* cited by examiner

*Primary Examiner* — Kuo Liang Peng
(74) *Attorney, Agent, or Firm* — Sughrue Mion, PLLC

(57) ABSTRACT

Compositions of curable silicone rubber compounds containing at least one metal siloxane-silanol(-ate) compound, a method for preparing curable silicone rubber compounds containing at least one metal siloxane-silanol(-ate) compound, as well as the use of curable silicone rubber compounds containing at least one metal siloxane-silanol(-ate) compound as a sealant, an adhesive material, a potting compound and/or a coating agent.

37 Claims, No Drawings

CURABLE SILICONE RUBBER COMPOUNDS

This application is a National Stage of International Application No. PCT/EP2018/060217 filed Apr. 20, 2018, claiming priority based on European Patent Application No. 17167603.4 filed Apr. 21, 2017.

Cold-curing silicone rubber compounds, so-called RTC (room temperature crosslinking) silicone rubber compounds, have been known for quite some time as tailored materials having elastic properties. They are generally used as sealing compounds or adhesive materials for glass, metals, such as aluminum, plastics, such as PVC, wood in (un)treated form, ceramics, stone or porcelain. In this case they are used, for example, as sealing and joint filling compounds in construction and in the sanitary sector or else, for example, as coating materials in the electrical industry (Römpp Chemie, CD-ROM, version 2.0, ed. E. Bartholome, Verlag Chemie, Weinheim 1982, volume 21, p. 511 ff.). In particular, RTC-1 silicone rubber compounds are used. They represent single component RTC silicone rubber compounds, for example, plastically moldable mixtures of α,ω-dihydroxypolyorganosiloxanes and appropriate hardeners or cross-linking agents, respectively. Under the influence of atmospheric moisture or water they generally polymerize at room temperature.

Preferably polyorganosiloxanes, which carry two or more functional groups, are used together with various polyfunctional hardeners, depending on the desired chemical and physical properties of the polymerization product and the desired polymerization rate. In this case α,ω-dihydroxypolyorganosiloxanes are very important as the difunctional polyorganosiloxanes. The crosslinking agents or hardeners, respectively, are characterized by hydrolyzable SiX groups, which release by hydrolysis leaving groups, which allow a classification of the hardeners in neutral, acidic or basic systems. Known leaving groups are, for example, carboxylic acids, alcohols and oximes. EP 2 030 976 B1 describes silane compounds that release α-hydroxycarboxylic acid ester on crosslinking.

DE 202015009122 U1 discloses silanes with α-hydroxycarboxylic acid amides as the leaving group.

The polymerization of the RTC-1 silicone rubber compounds at room temperature in the presence of atmospheric moisture can be accelerated by the addition of a suitable curing catalyst.

In particular, tin compounds are very important in this case. DE 69501063 T2 describes the use of dibutyltin-bis(acetylacetonate) and tin octylate in silicone elastomer compositions that cure at ambient temperature. EP 0298877 B1 describes a tin catalyst, comprising tin oxide and β-dicarbonyl compounds for silicone elastomer compositions. DE 4332037 A1 uses dibutylditindilaurate as a catalyst in condensation-crosslinking silicone.

Tin compounds are generally characterized by a very high catalytic activity. Due to their toxic properties, however, the use of tin-free curing catalysts in RTC silicone rubber compounds is frequently avoided.

Suitable tin-free catalysts comprise, for example, aluminum, zinc, zirconium and titanium compounds. DE 4210349 A1 describes the use of tetrabutyl titanate, dibutyl-bis(methylacetoacetato)titanate, diisopropyl-bis(methylacetoacetato)titanate and diisobutyl-bis(ethylacetoacetato)titanate in the preparation of a silicone rubber, crosslinking at room temperature by condensation reactions. EP 0102268 A1 discloses single component silicone resin compounds, which contain, for example, organic zirconium compounds as a catalyst.

To date the major disadvantages in the use of tin-free catalysts are the comparatively low catalytic activity and the associated poor mechanical properties, in particular, based on the lower tear strength of the silicone rubber compounds.

Therefore, the object of the present invention is to provide a composition that with the use of catalysts having a low tin content or with the use of tin-free catalysts yields silicone rubber compounds that are characterized by improved mechanical properties.

Hence, the essence of the invention is a composition of curable silicone rubber compounds containing at least one metal siloxane-silanol(-ate) compound, a method for the preparation of curable silicone rubber compounds containing at least one metal siloxane-silanol(-ate) compound as well as the use of curable silicone rubber compounds containing at least one metal siloxane-silanol(-ate) compound as a sealant, an adhesive material, a potting compound and/or a coating agent. In this case the metal siloxane-silanol(-ate) compound is used preferably in a catalytically active amount in silicone rubber compounds.

Thus, the object of the invention is achieved by the composition in accordance with claim 1, the method specified in claim 16, the uses specified in claims 14 and 19, as well as the sealing material specified in claim 17. Advantageous embodiments are the subject matter of the respective dependent claims.

In one advantageous embodiment the object of the invention is achieved by the use of metal siloxane-silanol(-ate) compounds as a catalyst in curable silicone compositions, wherein the molar concentration of the metal siloxane-silanol(-ate) compound is in the range of from 0.00001 to 0.01 mol/kg of sealing material, preferably in the range of from 0.00005 to 0.005 mol/kg of sealing material and more preferably in the range of from 0.00007 and 0.0019 mol/kg of sealing material.

In a preferred embodiment metal siloxane-silanol(-ate) compounds are used as a catalyst in curable silicone compositions, wherein the molar concentration of the metal siloxane-silanol(-ate) compound is in the range of from 0.00001 to 0.01 mol/kg of composition, preferably in the range of from 0.00005 to 0.005 mol/kg of composition, and more preferably in the range of from 0.00007 and 0.0019 mol/kg of composition.

The object of the invention is achieved advantageously by the use of at least one metal siloxane-silanol(-ate) compound as a catalyst in curable silicone compositions. Metal siloxane-silanol(-ate) compounds are known, in principle, to the person skilled in the art, for example, from WO 2005/060671 A2 and EP 2796493 A1.

Furthermore, the object of the invention is achieved by the use of at least one metal siloxane-silanol(-ate) compound as a catalyst in curable silicone compositions, wherein the proportion by weight of the metal siloxane-silanol compound is in the range of from 0.001 to 0.5% and preferably in the range of from 0.006 to 0.17%.

For the purposes of the invention "silicone rubber compounds" are synthetic silicone-containing rubber compounds, which in the scope of this invention are also referred to interchangeably as curable silicone compositions, a term that includes rubber polymers, polycondensates, and polyadducts. Said compounds or compositions, respectively, may be converted into the highly elastic, cured state by crosslinking with suitable crosslinkers. Furthermore, they are plastically moldable mixtures, which comprise, for example, α,ω-dihydroxypolyorganosiloxanes and suitable hardeners or crosslinking agents, respectively, and which can be stored in the absence of moisture; however, these silicone rubber compounds polymerize at room temperature under the influence of water or atmospheric moisture.

For the purposes of the invention "silanols" are organic silicon compounds, in which at least one hydroxyl group (OH) is bonded to the silicon atom (≡Si—OH).

For the purposes of the invention "silanolates" are organic silicon compounds, in which at least one deprotonated hydroxy function (R—O$^-$) is bonded to the silicon atom (≡Si—O$^-$), wherein this negatively charged oxygen atom can also be bonded to other compounds, such as, for example, metals, and/or can be coordinated.

The term "metal siloxane-silanol(-ate)" refers to all metal siloxane compounds containing either one or more silanol and/or silanolate groups. In one embodiment of the invention it is also possible that only metal siloxane-silanolates are present. All combinations are included, unless a detailed distinction is made between these different constellations. The metal siloxane-silanol(-ate) compounds (=metal siloxane-silanol/silanolate compounds), as just described, are also referred to below as "M3S" compounds. The terms are used interchangeably in the following.

The term "catalyst" refers to a substance that lowers the activation energy of a given reaction and, in so doing, increases the reaction rate.

In particular, the subject matter of the invention is a composition obtainable by mixing the following components:

a. at least one silicone compound having the general formula HO—(SiR$^l$R$^m$O)$_o$—H, where R$^l$ and R$^m$ denote independently of one another an optionally substituted hydrocarbon radical having 1 to 20 carbon atoms, and o is an integer of from 5 to 4,000, b. a catalyst, wherein the catalyst contains at least one metal siloxane-silanol(-ate) compound that comprises, in particular, a metal selected from the group consisting of s and p block metals, d and f block transition metals, lanthanide and actinide metals and semimetals, and c. at least one crosslinker having the general formula Si(R)$_m$(R$^a$)$_{4-m}$, where each R denotes independently of one another an optionally substituted hydrocarbon radical having 1 to 20 carbon atoms, in particular, an optionally substituted, straight chain or branched C1 to C16 alkyl group, an optionally substituted, straight chain or branched C2 to C16 alkenyl group or an optionally substituted C4 to C14 aryl group, m is an integer of from 0 to 2, each R$^a$ is selected independently of one another from the group consisting of a hydroxycarboxylic acid ester radical having the general structural formula (I):

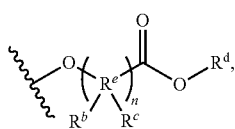

(I)

where each R$^b$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each R$^c$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, R$^d$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, R$^e$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and n is an integer of from 1 to 10, a hydroxycarboxylic acid amide radical having the general structural formula (II):

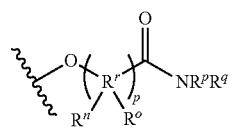

(II)

where each R$^n$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each R$^o$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, R$^p$ and R$^q$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, R$^r$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and p is an integer of from 1 to 10, a carboxylic acid radical —O—C(O)—R$^f$, where R$^f$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, an oxime radical —O—N=CR$^g$R$^h$, where R$^g$ and R$^h$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, a carboxylic acid amide radical —N—($R^i$)—C(O)—$R^j$, where $R^i$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and RJ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and an alkoxy radical —$OR^k$, where $R^k$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group.

Surprisingly it has been found that the metal siloxane-silanol(-ate) compounds, defined in claim 1, exhibit a particularly high catalytic activity when used as a catalyst in silicone rubber compounds. In particular, a high catalytic activity of metal siloxane-silanol(-ate) compounds as a catalyst has been found in moisture-curing silicone rubber compounds. Due to the high catalytic activity it is possible to significantly reduce the amount of catalyst in silicone rubber compounds. The use of catalytically active metal siloxane-silanol(-ate) compounds makes it possible to minimize or even avoid the use of tin catalysts.

The composition may contain the silicone compound having the general formula HO—(Si$R^l$$R^m$O)$_o$—H and the crosslinker having the general formula Si(R)$_m$($R^a$)$_{4-m}$ in the form of a prepolymer. The prepolymer is a reaction product of the two constituents. These reactions are known and are also referred to as end capping (see, for example, WO 2016/146648 A1).

It has been shown that not only the formation of the prepolymer, as just described, but also the subsequent polymerization or condensation, respectively, occur in the presence of water or atmospheric moisture and in the presence of the catalyst, defined in claim 1, to form Si—O—Si bonds. That means that the M3S compound facilitates not only the end capping, but also the curing of the silicone compound. Moreover, it is possible in a preferred embodiment to obtain the silicone rubber compounds in only one working step.

In this case it has been found surprisingly that the use of M3S in silicone rubber compounds results in improved mechanical properties, in particular, an improved tear strength of the silicone rubber compounds.

The "tear strength" is one of the mechanical properties of polymers that can be determined by various test methods. The "tear strength" can be determined by the tensile stress at the moment that the test specimen tears in the tensile test.

The "elongation at break" is the ratio of the change in length to the initial length after the test specimen has broken. Said elongation at break expresses the ability of a material to withstand changes in shape without cracking. The elongation at break is determined in accordance with DIN EN ISO 8339 and DIN 53504 in the tensile test.

The "tensile stress value" defines the stress exerted on the adhesive surfaces or the adjacent building material, respectively at 100% elongation of the sealing material.

The "secant modulus" refers to the ratio of stress to strain at any point in the curve of a stress-strain diagram. It is the slope of a curve from the beginning to any point on the stress-strain curve.

The "elastic recovery" describes the tendency of a flexible support to resume all or part of the original dimensions after releasing the forces that caused the expansion or deformation. The average elastic recovery is determined in accordance with DIN EN ISO 7389.

The term "crosslinkers" shall mean, in particular, crosslinkable silane compounds that comprise at least two groups that can be split off by hydrolysis. Examples of such crosslinkable silane compounds are $Si(OCH_3)_4$, $Si(CH_3)(OCH_3)_3$ and $Si(CH_3)(C_2H_5)(OCH_3)_2$. Crosslinkers may also be referred to as hardeners. In particular, a "crosslinker" also comprises, in particular, "crosslinker systems" that may contain more than one crosslinkable silane compound.

For the purposes of the invention a "cage" or an oligomeric or polymeric "cage structure" shall mean a three dimensional arrangement of the chain-shaped metal siloxane-silanol(-ate) compound, wherein the individual atoms of the chain form the cornerstones of a multifaceted basic structure of the compound. In this case at least two surfaces are defined by the atoms linked to one another, so that the result is a common intersection. In one embodiment of the compound, for example, a cube-shaped basic structure of the compound is formed.

"Sealants" or "sealing compounds" refer to elastic materials that are applied in liquid to viscous form or as flexible profiles or webs for sealing a surface, in particular, against water, gases or other media.

The term "adhesive material" refers to substances that join mating members through surface adherence (adhesion) and/or internal strength (cohesion). This term covers, in particular, glue, paste, dispersion adhesive materials, solvent-based adhesive materials, reaction adhesive materials and contact adhesive materials.

"Coating agents" are all means of coating a surface.

In accordance with the invention "potting compounds" or also "cable potting compounds" are compounds that are to be processed in the hot or cold state for purposes of potting cables and/or cable accessories.

The term "alkyl group" shall mean a saturated hydrocarbon chain. Alkyl groups have, in particular, the general formula —$C_nH_{2n+1}$. The term "C1 to C16 alkyl group" refers, in particular, to a saturated hydrocarbon chain having 1 to 16 carbon atoms in the chain. Examples of C1 to C16 alkyl groups are methyl, ethyl, propyl, butyl, isopropyl, isobutyl, sec-butyl, tert-butyl, n-pentyl and ethylhexyl. Correspondingly a "C1 to C8 alkyl group" refers, in particular, to a saturated hydrocarbon chain having 1 to 8 carbon atoms in the chain. In particular, alkyl groups may also be substituted, even if this is not specifically indicated.

"Straight chain alkyl groups" refer to alkyl groups that contain no branches. Examples of straight chain alkyl groups are methyl, ethyl, n-propyl, n-butyl, n-pentyl, n-hexyl, n-heptyl and n-octyl.

"Branched alkyl groups" refer to alkyl groups that are not straight chain, in which, therefore, in particular, the hydrocarbon chain has a fork. Examples of branched alkyl groups are isopropyl, isobutyl, sec-butyl, tert-butyl, sec-pentyl, 3-pentyl, 2-methylbutyl, isopentyl, 3-methylbut-2-yl, 2-methylbut-2-yl, neopentyl, ethylhexyl, and 2-ethylhexyl.

"Alkenyl groups" refer to hydrocarbon chains that contain at least one double bond along the chain. For example, an alkenyl group having a double bond has, in particular, the general formula —$C_nH_{2n-1}$. However, alkenyl groups may also have more than one double bond. The term "C2 to C16 alkenyl group" refers, in particular, to a hydrocarbon chain having 2 to 16 carbon atoms in the chain. In this case the number of hydrogen atoms varies as a function of the number of double bonds in the alkenyl group. Examples of alkenyl groups are vinyl, allyl, 2-butenyl and 2-hexenyl.

"Straight chain alkenyl groups" refer to alkenyl groups that contain no branches. Examples of straight chain alkenyl groups are vinyl, allyl, n-2-butenyl and n-2-hexenyl.

"Branched alkenyl groups" refer to alkenyl groups that are not straight chain, in which, therefore, in particular, the hydrocarbon chain has a fork. Examples of branched alkenyl groups are 2-methyl-2-propenyl, 2-methyl-2-butenyl and 2-ethyl-2-pentenyl.

"Aryl groups" refer to monocyclic (for example, phenyl), bicyclic (for example, indenyl, naphthalenyl, tetrahydronaphthyl, or tetrahydroindenyl) and tricyclic (for example, fluorenyl, tetrahydrofluorenyl, anthracenyl, or tetrahydroanthracenyl) ring systems, in which the monocyclic ring system or at least one of the rings in a bicyclic or tricyclic ring system is aromatic. In particular, a C4 to C14 aryl group refers to an aryl group having 4 to 14 carbon atoms. Aryl groups may, in particular, also be substituted, even if this is not specifically indicated.

An "aromatic group" refers to cyclic, planar hydrocarbons having an aromatic system. An aromatic group having 4 to 14 carbon atoms refers, in particular, to an aromatic group containing 4 to 14 carbon atoms. The aromatic group may be, in particular, monocyclic, bicyclic or tricyclic. Furthermore, an aromatic group may also contain 1 to 5 heteroatoms selected from the group consisting of N, O, and S. Examples of aromatic groups are benzene, naphthalene, anthracene, phenanthrene, furan, pyrrole, thiophene, isoxazole, pyridine and quinoline, wherein in the aforementioned examples the necessary number of hydrogen atoms is removed in each case to allow incorporation into the corresponding structural formula.

A "cycloalkyl group" refers to a hydrocarbon ring that is not aromatic. In particular, a cycloalkyl group having 4 to 14 carbon atoms refers to a non-aromatic hydrocarbon ring having 4 to 14 carbon atoms. Cycloalkyl groups may be saturated or partially unsaturated. Saturated cycloalkyl groups are not aromatic and also have no double or triple bonds. In contrast to saturated cycloalkyl groups, partially unsaturated cycloalkyl groups have at least one double or triple bond, but the cycloalkyl group is not aromatic. Cycloalkyl groups may also be, in particular, substituted, even if this is not specifically indicated.

An "aralkyl group" refers to an alkyl group substituted by an aryl group. A "C5 to C15 aralkyl group" refers, in particular, to an aralkyl group having 5 to 15 carbon atoms, with the carbon atoms of both the alkyl group and the aryl group being contained therein. Examples of aralkyl groups are benzyl and phenylethyl. Aralkyl groups may also be, in particular, substituted, even if this is not specifically indicated.

A "cyclic ring system" refers to a hydrocarbon ring that is not aromatic. In particular, a cyclic ring system having 4 to 14 carbon atoms refers to a non-aromatic hydrocarbon ring system having 4 to 14 carbon atoms. A cyclic ring system may consist of a single hydrocarbon ring (monocyclic), two hydrocarbon rings (bicyclic), or three hydrocarbon rings (tricyclic). In particular, cyclic ring systems may also contain 1 to 5 heteroatoms, preferably selected from the group consisting of N, O, and S.

"Saturated cyclic ring systems" are not aromatic and also have no double or triple bonds. Examples of saturated cyclic ring systems are cyclopentane, cyclohexane, decalin, norbornane and 4H-pyran, wherein in the aforementioned examples the necessary number of hydrogen atoms is removed in each case in order to allow incorporation into the corresponding structural formula. For example, in a structural formula HO—R●—$CH_3$, where R● is a cyclic ring system having 6 carbon atoms, in particular, cyclohexane, two hydrogen atoms would be removed from the cyclic ring system, in particular, cyclohexane, in order to allow incorporation into the structural formula.

Unless stated otherwise, N denotes, in particular, nitrogen. Furthermore, O denotes, in particular, oxygen, unless stated otherwise. S denotes, in particular, sulfur, unless stated otherwise.

"Optionally substituted" means that hydrogen atoms in the corresponding group or in the corresponding radical, respectively, may be replaced by substituents. Substituents may be selected, in particular, from the group consisting of C1 to C4 alkyl, methyl, ethyl, propyl, butyl, phenyl, benzyl, halogen, fluorine, chlorine, bromine, iodine, hydroxy, amino, alkylamino, dialkylamino, C1 to C4 alkoxy, phenoxy, benzyloxy, cyano, nitro, and thio. If a group is referred to as optionally substituted, then 0 to 50, in particular, 0 to 20, hydrogen atoms of the group may be replaced by substituents. If a group is substituted, then at least one hydrogen atom is replaced by a substituent.

"Alkoxy" refers to an alkyl group that is linked to the main carbon chain via an oxygen atom.

The term "polysiloxane" describes an inventive composition that contains at least one organosilicone compound, preferably two, three or more different organosilicone compounds. An organosilicone compound, contained in the composition, is preferably an oligomeric or polymeric compound. The polymeric organosilicone compound is preferably a difunctional polyorganosiloxane compound, more preferably an α,ω-dihydroxyl-terminated polyorganosiloxane. Very strong preference is given to α,ω-dihydroxyl-terminated polydiorganosiloxanes, in particular, α,ω-dihydroxyl-terminated polydialkylsiloxanes, α,ω-dihydroxyl-terminated polydialkenylsiloxanes or α,ω-dihydroxyl-terminated polydiarylsiloxanes. In addition to homopolymeric α,ω-dihydroxyl-terminated polydiorganosiloxanes, it is also possible to use heteropolymeric α,ω-dihydroxyl-terminated polydiorganosiloxanes having different organic substituents, wherein not only copolymers of monomers having identical organic substituents on a silicon atom, but also copolymers of monomers having various organic substituents are included on a silicon atom, for example, those with mixed alkyl, alkenyl and/or aryl substituents. The preferred organic substituents comprise straight chain and branched alkyl groups having 1 to 8 carbon atoms, in particular, methyl, ethyl, n- and iso-propyl, and n-, sec- and tert-butyl, vinyl and phenyl. In this case individual or all carbon-bonded hydrogen atoms may be substituted by conventional substituents, such as halogen atoms or functional groups, such as hydroxyl and/or amino groups, in the individual organic substituents. As a result, it is possible to use α,ω-dihydroxyl-terminated polydiorganosiloxanes having partially fluorinated or perfluorinated organic substituents, or α,ω-dihydroxyl-terminated polydiorganosiloxanes having hydroxyl and/or amino group-substituted organic substituents on the silicon atoms.

Particularly preferred examples of an organosilicone compound are α,ω-dihydroxyl-terminated polydialkylsiloxanes, such as, for example, α,ω-dihydroxyl-terminated polydimethylsiloxanes, α,ω-dihydroxyl-terminated polydiethylsiloxanes or α,ω-dihydroxyl-terminated polydivinylsiloxanes, and α,ω-dihydroxyl-terminated polydiarylsiloxanes, such as, for example, α,ω-dihydroxyl-terminated polydiphenylsiloxanes. In this case preference is given to polyorganosiloxanes that have a kinematic viscosity of from 5,000 to 120,000 cSt (at 25° C.), in particular, those having a viscosity of from 20,000 to 100,000 cSt, and more preferably those having a viscosity of from 40,000 to 90,000 cSt. It is also possible to use mixtures of polydiorganosiloxanes having different viscosities.

The term "sealing material", as used herein, describes the cured inventive composition in accordance with any one of the claims.

Advantageous embodiments of the invention will be explained in detail below.

One embodiment of the invention describes a composition containing the following components:
a. at least one silicone compound having the general formula HO—(SiR$^l$R$^m$O)$_o$—H, where R$^l$ and R$^m$ denote independently of one another an optionally substituted hydrocarbon radical having 1 to 20 carbon atoms, and o is an integer of from 5 to 4,000,
b. a catalyst, wherein the catalyst contains at least one metal siloxane-silanol(-ate) compound that comprises, in particular, a metal selected from the group consisting of s and p block metals, d and f block transition metals, lanthanide and actinide metals and semimetals, and
c. at least one crosslinker having the general formula Si(R)$_m$(R$^a$)$_{4-m}$, where each R denotes independently of one another an optionally substituted hydrocarbon radical having 1 to 20 carbon atoms, in particular, an optionally substituted, straight chain or branched C1 to C16 alkyl group, an optionally substituted, straight chain or branched C2 to C16 alkenyl group or an optionally substituted C4 to C14 aryl group, m is an integer of from 0 to 2,
each R$^a$ is selected independently of one another from the group consisting of
a hydroxycarboxylic acid ester radical having the general structural formula (I):

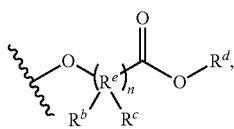

(I)

where
each R$^b$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group,
each R$^c$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group,
R$^d$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group,
R$^e$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and
n is an integer of from 1 to 10,
a hydroxycarboxylic acid amide radical having the general structural formula (II):

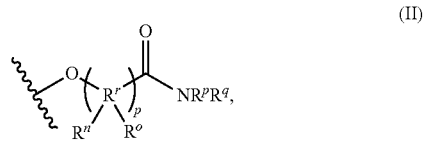

(II)

where
each R$^n$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group,
each R$^o$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group,
R$^p$ and R$^q$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group,
R$^r$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and
p is an integer of from 1 to 10,
a carboxylic acid radical —O—C(O)—R$^f$, where R$^f$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group,
an oxime radical —O—N=CR$^g$R$^h$, where R$^g$ and R$^h$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group,
a carboxylic acid amide radical —N—(R$^i$)—C(O)—R$^j$, where R$^i$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and $R^j$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and an alkoxy radical —$OR^k$, where $R^k$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group.

According to one embodiment of the invention, a composition of curable silicone rubber compounds contains at least one metal siloxane-silanol(-ate) compound, wherein the metal siloxane-silanol(-ate) compound is present at a proportion by weight in the range of from 0.001 to 0.5% and preferably in the range of from 0.006 to 0.17%. In particular, the metal siloxane-silanol(-ate) compound exhibits a catalytic activity. The inventive compositions in the various embodiments contain M3S catalysts in molar concentrations in the range of from 0.00001 to 0.01 mol/kg of composition, preferably in the range of from 0.00005 to 0.005 mol/kg of composition, and more preferably in the range of from 0.00007 to 0.0019 mol/kg of composition.

In one embodiment of the present invention the M3S compound may be in the form of a monomer, an oligomer and/or a polymer, wherein the transition from oligomers to polymers is fluid in accordance with the general definition.

Preferably the metal(s) in the oligomeric and/or polymeric M3S compound is/are present terminally and/or within the chain.

In one embodiment the chain-shaped M3S compound is linear, branched, and/or a cage.

In a preferred embodiment the chain-shaped metal siloxane-silanol(-ate) compound has a cage structure.

Preferably the M3S compound of the present invention comprises an oligomeric metal silsesquioxane.

In particular, the M3S compound of the present invention comprises a polyhedral metal silsesquioxane.

In one embodiment the metal silsesquioxane of the composition of the invention has the general formula $R^\bullet_q Si_r O_s M_t$, where each $R^\bullet$ is selected independently of one another from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl), each M is selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, q is an integer of from 4 to 19,
r is an integer of from 4 to 10,
s is an integer of from 8 to 30, and
t is an integer of from 1 to 8.

In another embodiment the metal silsesquioxane of the composition according to the invention has the general formula $R^\#_4 Si_4 O_{11} Y_2 Q_2 X_4 Z_3$, where each X is selected independently of one another from the group consisting of Si, $M^1$, -$M^3 L^1_A$, $M^3$, or —Si($R^8$)—O-$M^3 L^1_A$, where $M^1$ and $M^3$ are selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1 st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C8 cycloalkyl, optionally substituted C2 to C20 alkenyl and optionally substituted C5 to C10 aryl;

each Z is selected independently of one another from the group consisting of $L^2$, $R^5$, $R^6$ and $R^7$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

each $R^\#$, $R^5$, $R^6$ and $R^7$ is selected independently of one another from the group consisting of optionally substituted C1 to C20 alkyl, optionally substituted C3 to C8 cycloalkyl, optionally substituted C2 to C20 alkenyl and optionally substituted C5 to C10 aryl; each Y denotes independently of one another —O-$M^2$-$L^3_A$, or two Y are taken together and together denote —O-$M^2(L^3_A)$—O— or —O—, where $L^3$ is selected from the group consisting of —OH and —O—(C1 to C10 alkyl), in particular, —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ is selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, each Q denotes independently of one another H, $M^4 L^4_A$, —Si$R^8$, -$M^3 L^1_A$, a single bond linked to $M^3$ of X or a single bond linked to the Si atom of the radical —Si($R^8$)—O-$M^3 L^1_A$, where $M^3$, $R^8$ and $L^1$ are defined, as for X, where M4 is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and where $L^4$ is selected from the group consisting of —OH and —O—(C1 to C10 alkyl), in particular, —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, with the proviso that at least one X denotes $M^3$, -$M^3 L^1_A$ or —Si($R^8$)—O-$M^3 L^1_A$.

It is known to the person skilled in the art that the number ($\Delta$) of possible ligands for $L^1_A$, $L^2_A$, $L^3_A$, $L^4_A$ is determined directly from the number of free valences of the metal atom used, with the valence number describing the valence of the metal.

In an additional embodiment the metal silsesquioxane of the composition of the invention has the general formula $(Y_{0.25}R^{\#}SiO_{1.25})_4(Z_{0.75}Y_{0.25}XO)_4(OQ)_2$, where each X is selected independently of one another from the group consisting of Si, $M^1$, $-M^3L^1_A$, $M^3$, or $-Si(R^8)-O-M^3L^1_A$, where $M^1$ and $M^3$ are selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th, and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C6 cycloalkyl, optionally substituted C2 to C20 alkenyl and optionally substituted C6 to C10 aryl;

each Z is selected independently of one another from the group consisting of $L^2$, $R^5$, $R^6$ and $R^7$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl; each $R^{\#}$, $R^5$, $R^6$ and $R^7$ is selected independently of one another from the group consisting of optionally substituted C1 to C20 alkyl, optionally substituted C3 to C6 cycloalkyl, optionally substituted C2 to C20 alkenyl and optionally substituted C6 to C10 aryl;

each Y denotes independently of one another —O-$M^2$-$L^3_A$, or two Y are taken together and together denote —O-$M^2(L^3_A)$-O— or —O—, where $L^3$ is selected from the group consisting of —OH and —O—(C1 to C10 alkyl), in particular, —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and each $M^2$ is selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, each Q denotes independently of one another H, $M^4L^4_A$, —$SiR^8$, -$M^3L^1_A$, a single bond linked to $M^3$ of X or a single bond linked to the Si atom of the radical —$Si(R^8)$—O-$M^3L^1_A$, where $M^3$, $R^8$ and $L^1$ are defined, as for X, where $M^4$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and where $L^4$ is selected from the group consisting of —OH and —O—(C1 to C10 alkyl), in particular, —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, with the proviso that at least one X denotes $M^3$, -$M^3L^1_A$ or —$Si(R^8)$—O-$M^3L^1_A$.

The metal silsesquioxane of the present invention has preferably the general formula $Si_4O_9R^1R^2R^3R^4X^1X^2X^3X^4OQ^1OQ^2Y^1Y^2Z^1Z^2Z^3$, where $X^1$, $X^2$ and $X^3$ are selected independently of one another from Si or $M^1$, where $M^1$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and $Z^3$ are selected independently of one another from the group consisting of $L^2$, $R^5$, $R^6$ and $R^7$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are selected independently of one another from the group consisting of optionally substituted C1 to C20 alkyl, optionally substituted C3 to C8 cycloalkyl, optionally substituted C2 to C20 alkenyl and optionally substituted C5 to C10 aryl;

$Y^1$ and $Y^2$ denote independently of one another —O-$M^2$-$L^3_A$, or $Y^1$ and $Y^2$ are taken together and together denote —O-$M^2(L^3_A)$-O— or —O—, where $L^3$ is selected from the group consisting of —OH and —O—(C1 to C10 alkyl), in particular, —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and $X^4$ denotes -$M^3L^1_A$ or $M^3$, and $Q^1$ and $Q^2$ denote in each case H or a single bond linked to $M^3$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, or $X^4$ denotes -$M^3L^1_A$, and $Q^2$ denotes H or a single bond linked to $M^3$, and $Q^1$ denotes H, $M^4L^4_A$ or —$SiR^8$, where $M^4$ is selected from the group consisting of s and p block metals, d and f block transition metals, lanthanide and actinide metals and semimetals, in particular, from the group consisting of metals of the 2nd, 3rd, 4th, 5th and 8th subgroup and metals of the 1st, 2nd, 3rd, 4th and 5th main group, in particular, selected from the group consisting of Zn, Sc, Ti, Zr, Hf, V, Pt, Ga, Sn and Bi, where L4 is selected from the group consisting of —OH and —O—(C1 to C10 alkyl), in particular, —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, and where $R^1$ is selected from the group consisting of optionally substituted C1 to C20 alkyl, optionally substituted C3 to C8 cycloalkyl, optionally substituted C2 to C20 alkenyl and optionally substituted C5 to C10 aryl, or $X^4$, $Q^1$ and $Q^2$ denote independently of one another -$M^3L^1_A$, or $X^4$ denotes —$Si(R^8)$—O-$M^3L^1_A$, $Q^2$ denotes a single bond linked to the Si atom of $X^4$ and $Q^1$ denotes -$M^4L^4_A$, or $X^4$ denotes —$Si(R^8)$—O-$M^3L^1_A$, $Q^2$ denotes a single bond linked to the Si atom of $X_4$ and $Q^1$ denotes a single bond linked to the $M^3$ atom of $X^4$.

In a further embodiment the metal silsesquioxane has the general formula $(X^4)(Z^1Y^1X^2O)(Z^2X^1O_2)(Z^3X^3O_2)(R^1Y^2SiO)(R^3SiO)(R^4SiO_2)(R^2SiO_2)(Q^1)(Q^2)$, where $X^1$, $X^2$ and $X^3$ are selected independently of one another from Si or $M^1$, where $M^1$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and $Z^3$ are selected independently of one another from the group consisting of $L^2$, $R^5$, $R^6$ and $R^7$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are selected independently of one another from the group consisting of optionally substituted C1 to C20 alkyl, optionally substituted C3 to C6 cycloalkyl, optionally substituted C2 to C20 alkenyl and optionally substituted C6 to C10 aryl;

$Y^1$ and $Y^2$ denote independently of one another —O-$M^2$-$L^3_A$, or $Y^1$ and $Y^2$ are taken together and together denote —O-$M^2(L^3_A)$-O— or —O—, where $L^3$ is selected from the group consisting of —OH and —O—(C1 to C10 alkyl), in particular, —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and $M^2$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and $X^4$ denotes -$M^3L^1_A$ or $M^3$, and $Q^1$ and $Q^2$ denote in each case H or a single bond linked to $M^3$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, or $X^4$ denotes -$M^3L^1_A$ and $Q^2$ denotes H or a single bond linked to $M^3$, and $Q^1$ denotes H, $M^4L^4_A$ or —$SiR^8$, where $M^4$ is selected from the group consisting of s and p block metals, d and f block transition metals, lanthanide and actinide metals and semimetals, in particular, from the group consisting of metals of the 2nd, 3rd, 4th, 5th and 8th subgroup and metals of the 1st, 2nd, 3rd, 4th and 5th main group, in particular, selected from the group consisting of Zn, Sc, Ti, Zr, Hf, V, Pt, Ga, Sn and Bi, where $L^4$ is selected from the group consisting of —OH and —O—(C1 to C10 alkyl), in particular, —O—(C1 to C8 alkyl) or —O—(C1 to C6 alkyl), or where $L^4$ is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C6 cycloalkyl, optionally substituted C2 to C20 alkenyl and optionally substituted C6 to C10 aryl, or $X^4$, $Q^1$ and $Q^2$ denote independently of one another -$M^3L^1_A$, or $X^4$ denotes —$Si(R^8)$—O-$M^3L^1_A$, $Q^2$ denotes a single bond linked to the Si atom of $X^4$ and $Q^1$ denotes -$M^4L^4_A$, or $X^4$ denotes —$Si(R^8)$—O-$M^3L^1_A$, $Q^2$ denotes a single bond linked to the Si atom of $X^4$ and $Q^1$ denotes a single bond linked to the $M^3$ atom of $X^4$.

In a preferred embodiment the metal silsesquioxane has the general formula (III)

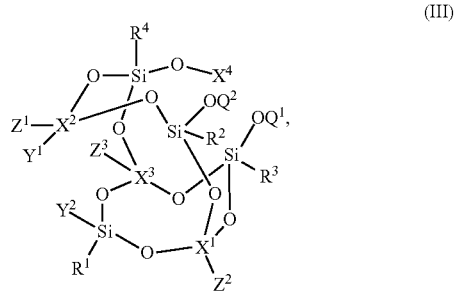

where $X^1$, $X^2$ and $X^3$ are selected independently of one another from Si or $M^1$, where $M^1$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt Cu, Ga, Sn and Bi; more preferably from the group consisting of Zn, Ti, Zr, Hf, V, Fe, Sn and Bi, $Z^1$, $Z^2$ and Z3 are selected independently of one another from the group consisting of $L^2$, $R^5$, $R^6$ and $R^7$, where L2 is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are selected independently of one another from the group consisting of optionally substituted C1 to C20 alkyl, optionally substituted C3 to C8 cycloalkyl, optionally substituted C2 to C20 alkenyl and optionally substituted C5 to C10 aryl;

$Y^1$ and $Y^2$ denote independently of one another —O-$M^2$-$L^3{}_A$, or $Y^1$ and $Y^2$ are taken together and together denote —O-$M^2(L^3{}_A)$-O— or —O—, where $L^3$ is selected from the group consisting of —OH and —O—(C1 to C10 alkyl), in particular, —O—(C1 to C8 alkyl) or —O—(C1 to C6 alkyl), or where $L^3$ is selected from the group consisting of —OH, —O-methyl, —O-ethyl, —O-propyl, —O-butyl, —O-octyl, —O-isopropyl, and —O-isobutyl, and where $M^2$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn, Bi, and $X^4$ denotes -$M^3L^1{}_A$ or $M^3$, and $Q^1$ and $Q^2$ denote in each case H or a single bond linked to $M^3$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn, Bi, or $X^4$ denotes -$M^3L^1{}_A$ and $Q^2$ denotes H or a single bond linked to $M^3$, and $Q^1$ denotes H, $M4L^4{}_A$ or —$SiR^8$, where $M^4$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi, more preferably from the group consisting of Zn, Ti, Zr, Hf, V, Fe, Sn, and Bi, and where $L^4$ is selected from the group consisting of —OH and —O—(C1 to C10 alkyl), in particular, —O—(C1 to C8 alkyl) or —O—(C1 to C6 alkyl), or where L4 is selected from the group consisting of —OH, —O-methyl, —O-ethyl, —O-propyl, —O-butyl, —O-octyl, —O-isopropyl, and —O-isobutyl, and where $R^8$ is selected from the group consisting of optionally substituted C1 to C20 alkyl, optionally substituted C3 to C6 cycloalkyl, optionally substituted C2 to C20 alkenyl and optionally substituted C6 to C10 aryl, or $X^4$, $Q^1$ and $Q^2$ denote independently of one another -$M^3L^1{}_A$, or $X^4$ denotes —Si($R^8$)—O-$M^3L^1{}_A$, $Q^2$ denotes a single bond linked to the Si atom of $X^4$ and $Q^1$ denotes -$M^4L^4{}_A$, or $X^4$ denotes —Si($R^8$)—O-$M^3L^1{}_A$, $Q^2$ denotes a single bond linked to the Si atom of $X^4$ and $Q^1$ denotes a single bond linked to the $M^3$ atom of $X^4$.

In an additional preferred embodiment the metal silsesquioxane has the general formula (III), where $X^1$, $X^2$ and $X^3$ denote independently of one another Si, $X^4$ denotes -$M^3L^1{}_A$, and $Q^1$ and $Q^2$ denote in each case a single bond linked to $M^3$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and $Z^3$ are each selected independently of one another from optionally substituted C1 to C20 alkyl, optionally substituted C3 to C8 cycloalkyl, optionally substituted C2 to C20 alkenyl and optionally substituted C5 to C10 aryl, $R^1$, $R^2$, $R^3$ are each selected independently of one another from optionally substituted C1 to C20 alkyl, optionally substituted C3 to C8 cycloalkyl, optionally substituted C2 to C20 alkenyl and optionally substituted C5 to C10 aryl, $Y^1$ and $Y^2$ are taken together and together form —O—.

In one embodiment the metal silsesquioxane according to formula (III) may be present in the metal siloxane-silanol(-ate) compound of the invention, as a function of the present equivalents of metal, as a monomer, dimer, trimer, multimer and/or mixtures thereof, so that, for example, structures according to the formulas (IIIa) to (IIIc) are possible,

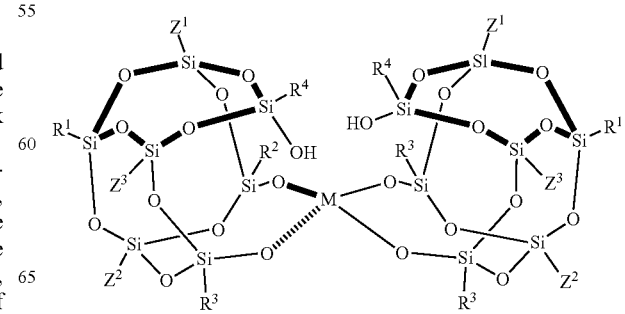

(IIIa)

-continued (IIIb)

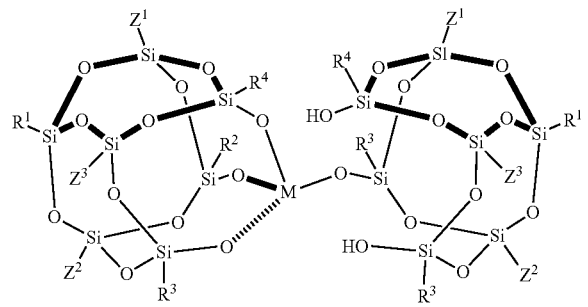

(IIIc)

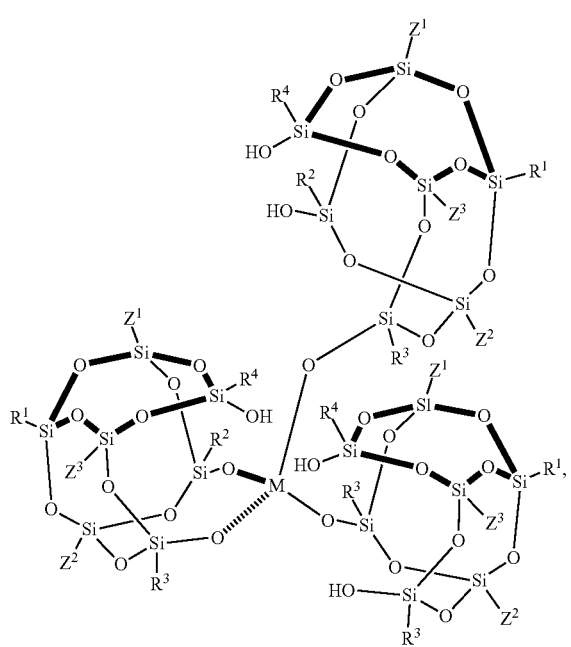

wherein M is selected from the group consisting of s and p block metals, d and f block transition metals, lanthanide and actinide metals and seminmetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and each R is selected independently of one another from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl). In this case the tetravalent metal M represents a common part of several cages. At the same time it is known to the person skilled in the art that the number of bonds to the metal M depends on the valence of the metal M. The structural formulas (IIIa) to (IIIc) are to be adapted accordingly, if necessary.

In one embodiment of the composition of the present invention there is a mixture of the metal silsesquioxanes according to the formulas (III), (IIIa), (IIIb) and (IIIc).

In one particularly preferred embodiment the metal silsesquioxane has the general structural formula (IV)

(IV)

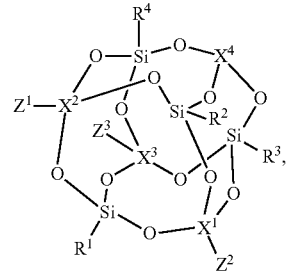

where $X^1$, $X^2$ and $X^3$ are selected independently of one another from Si or $M^1$, where $M^1$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and $Z^3$ are selected independently of one another from the group consisting of $L^2$, $R^5$, $R^6$ and $R^7$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl;

$R^1$, $R^2$, $R^3$, $R^4$, $R^5$, $R^6$ and $R^7$ are selected independently of one another from the group consisting of optionally substituted C1 to C20 alkyl, optionally substituted C3 to C8 cycloalkyl, optionally substituted C2 to C20 alkenyl and optionally substituted C5 to C10 aryl;

where $X^4$ denotes -$M^3L^1_A$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi.

In another particularly preferred embodiment the metal silsesquioxane has the general structural formula (V)

(V)

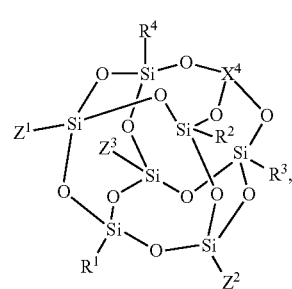

where $X^4$ denotes $-M^3L^1_A$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and Z3 are selected independently of one another from the group consisting of optionally substituted C1 to C20 alkyl, optionally substituted C3 to C8 cycloalkyl, optionally substituted C2 to C20 alkenyl and optionally substituted C5 to C10 aryl;

$R^1$, $R^2$, $R^3$ and $R^4$ are each selected independently of one another from the group consisting of optionally substituted C1 to C20 alkyl, optionally substituted C3 to C8 cycloalkyl, optionally substituted C2 to C20 alkenyl and optionally substituted C5 to C10 aryl.

Furthermore, the invention relates to metal silsesquioxanes of the general structural formula (V), where $X^4$ denotes $-M^3L^1_A$, where $L^1$ is selected from the group consisting of —OH and —O—(C1 to C10 alkyl), in particular, —O—(C1 to C8 alkyl) or —O—(C1 to C6 alkyl), or where $L^1$ is selected from the group consisting of —OH, —O-methyl, —O-ethyl, —O-propyl, —O-butyl, —O-octyl, —O-isopropyl, and —O-isobutyl, and where $M^3$ is selected from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, $Z^1$, $Z^2$ and $Z^3$ are selected independently of one another from the group consisting of $L^2$, $R^5$, $R^6$ and $R^1$, where $L^2$ is selected from the group consisting of —OH and —O—(C1 to C10 alkyl), in particular, —O—(C1 to C8 alkyl) or —O—(C1 to C6 alkyl), or where $L^2$ is selected from the group consisting of —OH, —O-methyl, —O-ethyl, —O-propyl, —O-butyl, —O-octyl, —O-isopropyl, and —O-isobutyl and $R^1$, $R^2$, $R^3$, $R^4$, $R^5$, $R^6$ and $R^7$ are selected independently of one another from the group consisting of optionally substituted C1 to C20 alkyl, optionally substituted C3 to C8 cycloalkyl, optionally substituted C2 to C20 alkenyl and optionally substituted C5 to C10 aryl.

Furthermore, the metal silsesquioxane according to formula (V) in the M3S compound of the present invention can comprise 6-fold coordinated metal centers, so that structures according to formula (Va) are possible

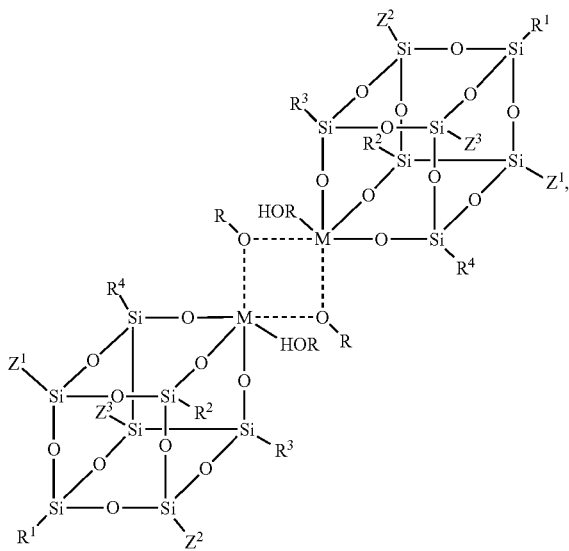
(Va)

where each M is selected independently of one another from the group consisting of s and p block metals, d and f block transition metals, lanthanide and actinide metals and semimetals, in particular, from the group consisting of metals of the 1st, 2nd, 3rd, 4th, 5th, 8th, 10th and 11th subgroup and metals of the 1st, 2nd, 3rd, 4th and 5th main group, preferably from the group consisting of Na, Zn, Sc, Nd, Ti, Zr, Hf, V, Fe, Pt, Cu, Ga, Sn and Bi; more preferably from the group consisting of Zn, Ti, Zr, Hf, V, Fe, Sn and Bi, and each R is selected independently of one another from the group consisting of optionally substituted C1 to C20 alkyl, optionally substituted C3 to C8 cycloalkyl, optionally substituted C2 to C20 alkenyl, optionally substituted C5 to C10 aryl, —OH and —O—(C1 to C10 alkyl).

In the curable composition according to the invention, the metal siloxane-silanol(-ate) compound may represent a mixture containing the structures (III), (IIIa), (IIIb), (IIIc), (IV), (V) and (Va).

In one embodiment cage structures, defined in the M3S compound, are present in addition to undefined oligomeric and/or polymeric structures and/or mixtures thereof.

In a preferred embodiment the metal in the M3S compound is a titanium.

In a particularly preferred embodiment the metal silsesquioxane of the M3S compound of the present invention has the structure (VI)

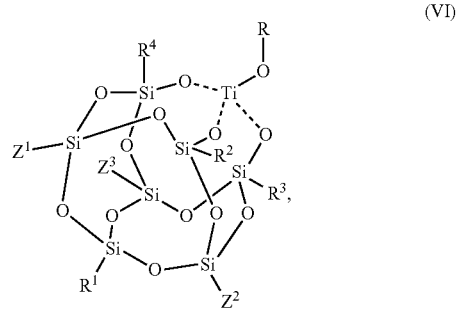
(VI)

where titanium is linked to OR, where R is selected from the group consisting of —H, -methyl, -ethyl, -propyl, -butyl, -octyl, -isopropyl, and -isobutyl, $Z^1$, $Z^2$ and $Z^3$ denote each independently of one another C1 to C20 alkyl, C3 to C8 cycloalkyl, C2 to C20 alkenyl and C5 to C10 aryl, in particular, are selected from the group consisting of methyl, ethyl, propyl, isopropyl, butyl, isobutyl, hexyl, heptyl, octyl, vinyl, allyl, butenyl and phenyl, and benzyl, and $R^1$, $R^2$, $R^3$ and $R^4$ denote each independently of one another C1 to C20 alkyl, C3 to C8 cycloalkyl, C2 to C20 alkenyl, and C5 to C10 aryl, in particular, are selected from the group consisting of methyl, ethyl, propyl, isopropyl, butyl, isobutyl, hexyl, heptyl, octyl, vinyl, allyl, butenyl and phenyl, and benzyl.

In a particularly preferred embodiment the metal silsesquioxane of the M3S compound of the present invention has the structure (VII)

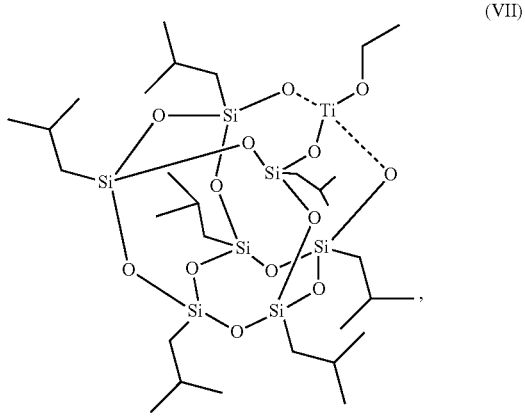

(VII)

where each Si is linked to an isobutyl radical, and titanium carries an ethanolate ligand. The compound of the structural formula (VII) is referred to herein as IBU-POSS-TI-OEt.

In a particularly preferred embodiment the metal siloxane-silanol(-ate) compound is IBU-POSS-Ti-OEt.

In another particularly preferred embodiment the M3S compound is octyl-POSS-Ti-OEt, where each Si is linked to an octyl radical, and titanium carries an ethanolate ligand.

Furthermore, the invention relates to silicone compounds of the general formula HO—$(SiR^jR^mO)_o$—H, where o is an integer of from 5 to 4,000.

In a preferred embodiment o in the silicone compound HO—$(SiR^jR^mO)_o$—H is an integer, in particular, of from 100 to 3,000, from 500 to 2,500, from 800 to 2,000 or from 1,000 to 1,600.

In another embodiment the silicone compound HO—$(SiR^jR^mO)_o$—H has a weight average molecular weight Mw of from 400 to 5,000,000, in particular, from 3,000 to 2,500,000, from 15,000 to 1,000,000, from 30,000 to 750,000, from 50,000 to 500,000, or from 70,000 to 120,000.

Furthermore, the composition relates to silicone compounds HO—$(SiR^jR^mO)_o$—H that have a kinematic viscosity of from 20 to 500,000 cSt at 25° C.

In a preferred embodiment the silicone compounds HO—$(SiR^jR^mO)_o$—H have a kinematic viscosity of from 20 to 350,000 cSt or from 20,000 to 100,000 cSt or from 20,000 to 90,000 cSt or from 20,000 to 80,000 cSt at 25° C.

In an additional preferred embodiment the invention relates to silicone compounds HO—$(SiR^jR^mO)_o$—H, where $R^j$ and $R^m$ denote independently of one another an optionally substituted, straight chain or branched C1 to C16 alkyl group, in particular, an optionally substituted, straight chain or branched C1 to C12 or C1 to C8 alkyl group, an optionally substituted, straight chain or branched C2 to C16 alkenyl group, in particular, an optionally substituted, straight chain or branched C2 to C12 or C2 to C8 alkenyl group, or an optionally substituted C4 to C14 aryl group, in particular, an optionally substituted C4 to C10 aryl group.

In a particularly preferred embodiment the invention relates to silicone compounds HO—$(SiR^jR^mO)_o$—H, where $R^j$ and $R^m$ are selected independently of one another from the group consisting of methyl, ethyl, propyl, butyl, trifluoromethyl, vinyl, allyl, butenyl, phenyl and naphthyl.

In a particularly preferred embodiment the invention relates to silicone compounds HO—$(SiR^jR^mO)_o$—H, wherein the silicone compound is α,ω-dihydroxy-dimethylpolysiloxane.

Furthermore, the composition of the present invention relates to crosslinkers of the general formula $Si(R)_m(R^a)_{4-m}$, where each $R^a$ is selected independently of one another from the group consisting of:

a hydroxycarboxylic acid ester radical having the general structural formula (I):

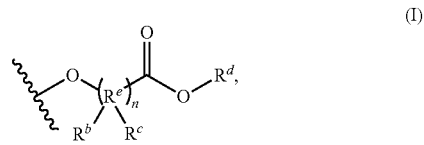

(I)

a hydroxycarboxylic acid amide radical having the general structural formula (II):

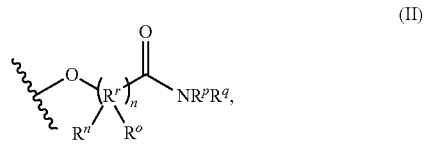

(II)

a carboxylic acid radical —O—C(O)—$R^f$,
an oxime radical —O—N=$CR^gR^h$,
a carboxylic acid amide radical —N—$(R^i)$—C(O)—$R^j$,
an alkoxy radical —$OR^k$.

In a preferred embodiment the crosslinker comprises radicals R of the general formula $Si(R)_m(R^a)_{4-m}$, where each radical R denotes independently of one another an optionally substituted, straight chain or branched C1 to C12 alkyl group, in particular, an optionally substituted, straight chain or branched C1 to C8 alkyl group, or an optionally substituted, straight chain or branched C2 to C12 alkenyl group, in particular, an optionally substituted, straight chain or branched C2 to C8 alkenyl group, or an optionally substituted C4 to C10 aryl group.

In a particularly preferred embodiment each radical R of the crosslinker of the general formula $Si(R)_m(R^a)_{4-m}$ denotes independently of one another a methyl, ethyl, propyl, vinyl, phenyl or allyl radical.

In one embodiment the crosslinker of the general formula $Si(R)_m(R^a)_{4-m}$ comprises radicals $R^a$ —$OR^k$, where $R^k$ is an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group, in particular, an optionally substituted, straight chain or branched C1 to C8 alkyl group, an optionally substituted C4 to C8 cycloalkyl group or an optionally substituted C4 to C10 aryl group or an optionally substituted C5 to C11 aralkyl group.

In a further embodiment the crosslinker of the general formula $Si(R)_m(R^a)_{4-m}$ comprises radicals $R^a$ —$OR^k$, where $R^k$ is selected from the group consisting of phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, ethylhexyl, and 2-ethylhexyl.

In a preferred embodiment the composition of the present invention comprises crosslinkers of the general formula $Si(R)_m(R^a)_{4-m}$, where each $R^a$ is selected independently of one another from the group consisting of:

a hydroxycarboxylic acid ester radical having the general structural formula (I):

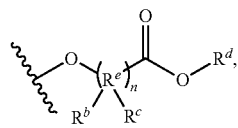

(I)

a hydroxycarboxylic acid amide radical having the general structural formula (II):

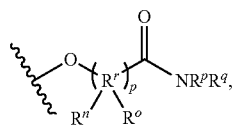

(II)

a carboxylic acid radical —O—C(O)—$R^f$, an oxime radical —O—N=$CR^gR^h$, a carboxylic acid amide radical —N—($R^i$)—C(O)—$R^j$, where each $R^b$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each $R^c$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, $R^d$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, $R^e$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and n is an integer of from 1 to 10;

where each $R^n$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each $R^o$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, $R^p$ and $R^q$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, $R^r$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and p is an integer of from 1 to 10, where $R^f$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, where $R^g$ and $R^h$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and where $R^i$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and $R^j$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group.

In a preferred embodiment the crosslinker comprises radicals R, wherein each R denotes independently of one another an optionally substituted, straight chain or branched C1 to C12 alkyl group, in particular, an optionally substituted, straight chain or branched C1 to C8 alkyl group, or an optionally substituted, straight chain or branched C2 to C12 alkenyl group, in particular, an optionally substituted, straight chain or branched C2 to C8 alkenyl group, or an optionally substituted C4 to C10 aryl group.

In a particularly preferred embodiment each radical R of the crosslinker of the general formula $Si(R)^m(R^a)_{4-m}$, is independently of one another a methyl, ethyl, propyl, vinyl, phenyl or allyl radical.

In one embodiment each $R^b$ and $R^c$ in the hydroxycarboxylic acid ester radical of the crosslinker is independently of one another an optionally substituted, straight chain or branched C1 to C12 alkyl group, in particular, an optionally substituted, straight chain or branched C1 to C8 alkyl group.

In a preferred embodiment each $R^b$ and $R^c$ in the hydroxycarboxylic acid ester radical of the crosslinker is selected independently of one another from the group consisting of H, methyl, ethyl, propyl, isopropyl, butyl, n-butyl, sec-butyl, isobutyl and tert-butyl, in particular, from the group consisting of H and methyl.

In one embodiment $R^d$ in the hydroxycarboxylic acid ester radical of the crosslinker is an optionally substituted, straight chain or branched C1 to C12 alkyl group, in particular, an optionally substituted, straight chain or branched C1 to C8 alkyl group, a C4 to C10 cycloalkyl group, a C5 to C11 aralkyl group or a C4 to C10 aryl group.

In a preferred embodiment $R^d$ in the hydroxycarboxylic acid ester radical of the crosslinker is selected from the group consisting of phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, ethylhexyl, and 2-ethylhexyl.

In a preferred embodiment $R^e$ in the hydroxycarboxylic acid ester radical of the crosslinker is a divalent benzene radical, or $R^e$ is C, and $R^b$ and $R^c$ are H, or $R^e$ is C, and $R^b$ is H, and $R^c$ is methyl.

In one embodiment n in the hydroxycarboxylic acid ester radical of the crosslinker is an integer of from 1 to 5, in particular, from 1 to 3, in particular, 1.

In a particularly preferred embodiment the crosslinker having hydroxycarboxylic acid ester radical is methyl-tris (ethylhexylsalicylato)silane and/or propyl-tris(ethylhexylsalicylato)silane.

In one embodiment each $R^n$ and $R^o$ in the hydroxycarboxylic acid amide radical of the crosslinker in the inventive composition is independently of one another H or an optionally substituted, straight chain or branched C1 to C12 alkyl group, in particular, an optionally substituted, straight chain or branched C1 to C8 alkyl group.

In a preferred embodiment each $R^n$ and $R^o$ in the hydroxycarboxylic acid amide radical of the crosslinker is selected independently of one another from the group consisting of H, methyl, ethyl, propyl, isopropyl, butyl, n-butyl, sec-butyl, isobutyl and tert-butyl, in particular, from the group consisting of H and methyl.

In another embodiment $R^p$ and $R^q$ in the hydroxycarboxylic acid amide radical of the crosslinker are independently of one another H or an optionally substituted, straight chain or branched C1 to C12 alkyl group, in particular, an optionally substituted, straight chain or branched C1 to C8 alkyl group, or an optionally substituted C4 to C14 cycloalkyl group or a C5 to C11 aralkyl group or a C4 to C10 aryl group.

In a preferred embodiment $R^p$ and $R^q$ in the hydroxycarboxylic acid amide radical of the crosslinker are selected independently of one another from the group consisting of H, phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, iso-pentyl, 3-methylbut-2-yl, 2-methylbut-2-yl, neopentyl, hexyl, heptyl, octyl, ethylhexyl, and 2-ethylhexyl.

In one embodiment $R^r$ in the hydroxycarboxylic acid amide radical of the crosslinker is a divalent benzene radical, or $R^r$ is C, and $R^n$ and $R^o$ are H, or $R^r$ is C, and $R^n$ is H, and $R^o$ is methyl.

In a further embodiment p in the hydroxycarboxylic acid amide radical of the crosslinker is an integer of from 1 to 5, in particular, from 1 to 3, in particular, 1.

In one embodiment $R^f$ in the carboxylic acid radical of the crosslinker of the composition of the invention is H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group, in particular, H or an optionally substituted, straight chain or branched C1 to C8 alkyl group, an optionally substituted C4 to C8 cycloalkyl group or an optionally substituted C4 to C10 aryl group or an optionally substituted C5 to C1 aralkyl group.

In a preferred embodiment $R^f$ in the carboxylic acid radical of the crosslinker is selected from the group consisting of H, phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, ethylhexyl, and 2-ethylhexyl.

In a particularly preferred embodiment the crosslinker having a carboxylic acid radical is ethyltriacetoxysilane and/or methyltriacetoxysilane and/or propyltriacetoxysilane.

In another embodiment $R^g$ and $R^h$ in the oxime radical of the crosslinker of the invention are independently of one another H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group, in particular, H or an optionally substituted, straight chain or branched C1 to C8 alkyl group, an optionally substituted C4 to C8 cycloalkyl group or an optionally substituted C4 to C10 aryl group or an optionally substituted C5 to C11 aralkyl group.

In a preferred embodiment $R^g$ and $R^h$ in the oxime radical of the crosslinker are selected independently of one another from the group consisting of H, phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, ethylhexyl, and 2-ethylhexyl.

In a particularly preferred embodiment the crosslinker having an oxime radical is methyl-tris(2-pentanonoximo) silane and/or vinyl-tris(2-pentanonoximo)silane.

In one embodiment $R^i$ and $R^j$ in the carboxylic acid amide radical of the crosslinker of the present invention are independently of one another H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group, in particular, H or an optionally substituted, straight chain or branched C1 to C8 alkyl group, an optionally substituted C4 to C8 cycloalkyl group or an optionally substituted C4 to C10 aryl group or an optionally substituted C5 to C11 aralkyl group.

In a preferred embodiment $R^i$ and $R^j$ in the carboxylic acid amide radical of the crosslinker are selected independently of one another from the group consisting of H, phenyl, tolyl, naphthyl, benzyl, cyclohexyl, methyl, ethyl, propyl, isopropyl, butyl, n-butyl, sec-butyl, isobutyl, tert-butyl, pentyl, n-pentyl, sec-pentyl, 3-pentyl, 2-methylbutyl, isopentyl, 3-methylbut-2-yl, 2-methylbut-2-yl, neopentyl, hexyl, heptyl, octyl, ethylhexyl, and 2-ethylhexyl.

In a particularly preferred embodiment the crosslinker having a carboxylic acid amide radical is methylethoxy-bis (N-methylbenzamido)silane.

In another particularly preferred embodiment mixtures of the described crosslinkers are used for the curable compositions according to the invention.

In a further particularly preferred embodiment the crosslinker carries various radicals $R^a$, as described above.

Furthermore, the invention relates to compositions containing an adhesion promoter.

Preferred adhesion promoters for use in compositions of the invention comprise organosilanes having one or more reactive amine groups, organosilanes having one or more reactive carboxylic acid groups, organosilanes having one or more reactive epoxy groups, or organosilanes having one or more reactive thiol groups or organosilanes having one or more tertiary amine groups, organosilanes having one or more urea groups, organosilanes having one or more amide groups, organosilanes having one or more carbamate groups and organosilanes having one or more isocyanurate groups; preferably mixtures of said components can be used.

In an additional, preferred embodiment the composition according to the invention contains an adhesion promoter, wherein the adhesion promoter is selected, in particular, from the group consisting of dibutoxydiacetoxysilane, 3-aminopropyltriethoxysilane, 3-aminopropyltrimethoxysilane, aminoethylaminopropyltrimethoxysilane, butylaminopropyltriethoxysilane, butylaminopropyltrimethoxysilane, propylaminopropyltriethoxysilane, propylaminopropyltrimethoxysilane, N-cyclohexyl-3-aminopropyltrimethoxysilane, N-cyclohexyl-3-aminopropyltriethoxysilane, diethylaminopropyltrimethoxysilane, dipropylaminopropyltrimethoxysilane, dibutylaminopropyltrimethoxysilane, trimethoxypropylsilylacetoxypropionamide, N,N'-bis(trimethoxysilylpropyl)urea, N,N'-bis(triethoxysilylpropyl)urea, is(triethoxysilylpropyl)diethylenetriurea, dimethylaminopropyltrimethoxysilane, 1,3,5-tris(trimethoxysilylpropyl)isocyanurate, N-methyl(3-trimethoxysilyl)propyl)carbamate, N-ethyl(3-triethoxysilyl)propyl)carbamate, and mixtures thereof, and N-(2-aminoethyl)-3-aminopropyltrimethoxysilane, which is available as Dynasylan DAMO from Evonik.

In a particularly preferred embodiment certain combinations of adhesion promoter and crosslinker are selected for the compositions according to the invention. As a result, the following combinations have proved to be advantageous:
  combination of crosslinkers with hydroxycarboxylic acid ester radicals or hydroxycarboxylic acid amide radicals, respectively, and "non-aminic adhesion promoters" (non-aminic, as used herein, means no primary and secondary amine groups) with tertiary amine, urea, amide, carbamate or isocyanurate groups. Concrete examples of such bonding agents (adhesion promoters) are N,N'-bis(triethoxysilylpropyl)urea, tris(triethoxysilylpropyl)diethylenetriurea, dimethylaminopropyltrimethoxysilane, 1,3,5-tris(trimethoxysilylpropyl)isocyanurate, N-methyl(3-trimethoxysilyl)propyl)carbamate and N-ethyl(3-triethoxysilyl)propyl)carbamate.
  combination of crosslinkers with carboxylic acid radicals and di-tertbutoxydiacetoxysilane (BDAC, CAS 13170-23-5)
  combination of crosslinkers with oxime radicals and commercially available aminosilanes containing, but not limited to, 3-aminopropyltriethoxysilane (AMEO), 3-aminopropyltrimethoxysilane (AMMO) and aminoethylaminopropyltrimethoxysilane.
  combination of crosslinkers with carboxylic acid amide radicals and commercially available aminosilanes containing, but not limited to, 3-aminopropyltriethoxysilane (AMEO), 3-aminopropyltrimethoxysilane (AMMO) and aminoethylaminopropyltrimethoxysilane.

For the purposes of the invention the curable compositions may be optionally modified with respect to their properties through the addition of conventional additives, such as plasticizers, fillers, colorants, thixotropic agents, wetting agents or UV stabilizers.

In a preferred embodiment polyalkylsiloxanes, in particular, preferably polydimethylsiloxane, are used as plasticizers.

In another preferred embodiment silica, in particular, preferably pyrogenic silicon dioxide, also referred to as fumed silica, is added to the curable composition as a filler.

In one embodiment the invention relates to compositions that can be obtained by mixing at least one M3S catalyst, at least one silicone compound having the general formula HO—(SiR$^l$R$^m$O)$_o$—H in accordance with claim 1 and at least one crosslinker having the general formula Si(R)$_m$(R$^a$)$_{4-m}$ in accordance with claim 1.

In one embodiment the composition of the invention can be obtained by mixing at least one metal silsesquioxane, according to the structural formula V; at least one silicone compound HO—(SiR$^l$R$^m$O)$_o$—H, where R$^l$ and R$^m$ are selected independently of one another from the group consisting of methyl, ethyl, propyl, butyl, trifluoromethyl, vinyl, allyl, butenyl, phenyl and naphthyl; and at least one crosslinker selected from the group consisting of methyl-tris (ethylhexylsalicilato)silane, propyl-tris(ethylhexylsalicilato) silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis (N-methylbenzamido)silane and/or mixtures thereof.

In one embodiment the composition of the invention can be obtained by mixing at least one metal silsesquioxane, according to the structural formula VI; at least one silicone compound HO—(SiR$^l$R$^m$O)$_o$—H, where R$^l$ and R$^m$ are selected independently of one another from the group consisting of methyl, ethyl, propyl, butyl, trifluoromethyl, vinyl, allyl, butenyl, phenyl and naphthyl; and at least one crosslinker selected from the group consisting of methyl-tris (ethylhexylsalicilato)silane, propyl-tris(ethylhexylsalicilato) silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis (N-methylbenzamido)silane and/or mixtures thereof.

In one embodiment the composition of the invention can be obtained by mixing at least one metal silsesquioxane according to the structural formula VII; at least one silicone compound HO—(SiR$^l$R$^m$O)$_o$—H, where R$^l$ and R$^m$ are selected independently of one another from the group consisting of methyl, ethyl, propyl, butyl, trifluoromethyl, vinyl, allyl, butenyl, phenyl and naphthyl; and at least one crosslinker selected from the group consisting of methyl-tris (ethylhexylsalicilato)silane, propyl-tris(ethylhexylsalicilato) silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis (N-methylbenzamido)silane and/or mixtures thereof.

In one embodiment the composition of the invention can be obtained by mixing octyl-POSS-Ti-OEt; at least one silicone compound HO—(SiR$^l$R$^m$O)$_o$—H, where R$^l$ and R$^m$ are selected independently of one another from the group consisting of methyl, ethyl, propyl, butyl, trifluoromethyl, vinyl, allyl, butenyl, phenyl and naphthyl; and at least one crosslinker selected from the group consisting of methyl-tris(ethylhexylsalicilato)silane, propyl-tris(ethylhexylsalicilato)silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis(N-methylbenzamido)silane and/or mixtures thereof.

In a preferred embodiment the composition of the present invention can be obtained by mixing at least one metal silsesquioxane according to the structural formula V; at least one silicone compound HO—(SiR$^l$R$^m$O)$_o$—H, where the silicone compound is α,ω-dihydroxy-dimethylpolysiloxane; and at least one crosslinker selected from the group consisting of methyl-tris(ethylhexylsalicilato)silane, propyl-tris(ethylhexylsalicilato)silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis(N-methylbenzamido)silane and/or mixtures thereof.

In a preferred embodiment the composition of the invention can be obtained by mixing at least one metal silsesquioxane according to the structural formula VI; at least one silicone compound HO—(SiR$^l$R$^m$O)$_o$—H, where the silicone compound is α,ω-dihydroxy-dimethylpolysiloxane; and at least one crosslinker selected from the group consisting of methyl-tris(ethylhexylsalicilato)silane, propyl-tris(ethylhexylsalicilato)silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis(N-methylbenzamido)silane and/or mixtures thereof.

In a preferred embodiment the composition of the invention can be obtained by mixing at least one metal silsesquioxane according to the structural formula VII; at least one silicone compound HO—(SiR$_l$R$^m$O)$_o$—H, where the silicone compound is α,ω-dihydroxy-dimethylpolysiloxane; and at least one crosslinker selected from the group consisting of methyl-tris(ethylhexylsalicilato)silane, propyl-tris(ethylhexylsalicilato)silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis(N-methylbenzamido)silane and/or mixtures thereof.

In a preferred embodiment the composition of the invention can be obtained by mixing octyl-POSS-Ti-OEt; at least one silicone compound HO—(SiR$^l$R$^m$O)$_o$—H, where the silicone compound is α,ω-dihydroxy-dimethylpolysiloxane; and at least one crosslinker selected from the group consisting of methyl-tris(ethylhexylsalicilato)silane, propyl-tris(ethylhexylsalicilato)silane, ethyltriacetoxysilane, methyltriacetoxysilane, propyltriacetoxysilane, methyl-tris(2-pentanonoximo)silane, vinyl-tris(2-pentanonoximo)silane, methylethoxy-bis(N-methylbenzamido)silane and/or mixtures thereof.

In one embodiment the molar ratio of crosslinker of the general formula Si(R)$_m$(R$^a$)$_{4-m}$ to M3S catalyst in the composition of the invention is 20 to 2,000, preferably 100 to 2,000 and more preferably 125 to 2,000.

In a preferred embodiment of the composition of the invention the molar ratio of crosslinker of the general formula Si(R)$_m$(R$^a$)$_{4-m}$, where R$^a$ is in the form of a carboxylic acid radical, to a catalyst of formula V is 300 to 1,500, preferably 400 to 1,300 and more preferably 1,000 to 1,500.

In a preferred embodiment of the composition of the invention the molar ratio of crosslinker of the general formula Si(R)$_m$(R$^a$)$_{4-m}$, where R$^a$ is in the form of a carboxylic acid radical, to a catalyst, according to formula VI, is 300 to 1,500, preferably 400 to 1,300 and more preferably 1,000 to 1,500.

In a particularly preferred embodiment of the composition according to the invention, the molar ratio of crosslinker of the general formula Si(R)$_m$(R$^a$)$_{4-m}$, where R$^a$ is in the form of a carboxylic acid radical, to a catalyst, according to formula VII, is 300 to 1,500, preferably 400 to 1,300 and more preferably 1,000 to 1,500.

In one embodiment of the composition of the invention the molar ratio of crosslinker of the general formula Si(R)$_m$(R$^a$)$_{4-m}$, where R$^a$ is in the form of an oxime radical, to a catalyst, according to formula V, is 100 to 2,000, preferably 125 to 2,000 and more preferably 150 to 2,000.

In a preferred embodiment of the composition of the invention the molar ratio of crosslinker of the general formula Si(R)$_m$(R$^a$)$_{4-m}$, where R$^a$ is in the form of an oxime radical, to a catalyst, according to formula VI, is 100 to 2,000, preferably 125 to 2,000 and more preferably 150 to 2,000.

In a particularly preferred embodiment of the composition of the invention the molar ratio of crosslinker of the general formula Si(R)$_m$(R$^a$)$_{4-m}$, where R$^a$ is in the form of an oxime radical, to a catalyst, according to formula VII, is 100 to 2,000, preferably 125 to 2,000 and more preferably 125 to 2,000.

In one embodiment the composition of the invention exhibits, after curing, an elongation at break of from 450 to 1,300%, preferably from 500 to 1,300% and more preferably from 700 to 1,300% in accordance with DIN 53504.

In one embodiment the composition of the invention exhibits, after curing, an elongation at break of from 210% to 1,300%, preferably from 500 to 1,300% and more preferably from 700 to 1,300% in accordance with DIN 8339.

Furthermore, the invention relates to sealing materials obtainable by curing a composition containing
i. at least one silicone compound having the general formula HO—(SiR$^l$R$^m$O)$_o$—H, where o and the radicals R$^l$ and R$^m$ are defined in accordance with claim 1,
ii. a catalyst, wherein the catalyst contains at least one M3S compound, and
iii. at least one crosslinker having the general formula Si(R)$_m$(R$^a$)$_{4-m}$, where m and the radicals R and R$^a$ are defined in accordance with claim 1.

Furthermore, the invention relates to the use of a metal siloxane-silanol(-ate) compound as a catalyst for crosslinking a composition containing a silicone compound having the general formula HO—(SiR$^l$R$^m$O)$_o$—H, where o and the radicals R$^l$ and R$^m$, wherein the respective parameters are defined as already described.

Furthermore, the invention relates to a method for preparing a composition, wherein said method comprises the following process steps:
a. providing a composition containing
 i. at least one silicone compound having the general formula HO—(SiR$^l$R$^m$O)$_o$—H, where o and the radicals R$^l$ and R$^m$ are defined in accordance with claim 1,
 ii. a catalyst, wherein the catalyst contains at least one M3S compound, and
 iii. at least one crosslinker having the general formula Si(R)$_m$(R$^a$)$_{4-m}$, where m and the radicals R and R$^a$ are defined in accordance with claim 1.
b. mixing the composition, provided in a., using mechanical and/or thermal energy.

The compositions of the present invention are characterized by an improved catalytic activity or efficiency of the catalyst.

The compositions of the present invention are characterized by an improved catalytic activity or efficiency of the M3S compound as a catalyst.

The compositions of the present invention are characterized by an improved catalytic activity or efficiency of the catalyst, as a result of which the use of tin compounds can be avoided.

The compositions of the present invention are characterized by an improved catalytic activity or efficiency of the catalyst, a feature that allows the use of comparatively small amounts (in percentages by weight or moles per kilogram of sealing material) of catalyst.

The M3S compounds, which are used in the scope of the present invention, and their preparation are known to those skilled in the art from conventional silicone resin preparation methods. Silicone resins are formed, for example, by controlled hydrolysis of silane compounds with hydrolyzable leaving groups and subsequent condensation reaction (see, for example, B. Tieke, Macromolecular Chemistry: An Introduction, second completely revised and expanded edition, chapter 2.1.8.5 silicone resins). The number of hydrolyzable leaving groups of the silane and the molar ratio of water to silane determine the degree of crosslinking and polymerization of the silicone resins. These silicone resins are incorporated into the oligomeric or polymeric silicone compound by adding metal alcoholates (see WO 2015114050 A1). General preparation methods of (metal) silsesquioxanes are also known from the literature (see, for example, P. G. Harrison, *J. Organomet. Chem.* 1997, 542, 141; J. D. Lichtenhan, *Comments Inorg. Chem.* 1995, 17, 115; R. Murugavel, A. Voigt, M. G. Walawalkar, H. W. Roesky, *Chem. Rev.* 1996, 96, 2205; WO 01/10871 A1; WO 07/041344 A8).

General Preparation Methods

Synthesis of [Ti(POSS)1.5] as 5% by wt. of Master Batch in Polyol with Titanium Isopropoxide To a solution of isobutyltrisilanol-POSS (47 g, 59 mmol) in 190 ml of toluene is added titanium isopropoxide (12 ml, 44 mmol). The reaction mixture is heated to 50 to 67° C. for 60 to 180 minutes. Then Daltocel F 428 (950 g) is added to the reaction mixture. Removal of the solvent toluene at 80° C. to 150° C. for an additional 30 to 80 minutes yields a clear liquid without insoluble residues as a concentrate (master batch).

In addition to toluene, it is possible to use conventional aprotic solvents, such as hexane. Furthermore, there is the option that the amount of titanium propoxide may be varied, in order to obtain more ratios of POSS and titanium. The solvent exchange can also be carried out under reduced pressure.

The data given in the examples are in percentages by weight of the individual components, unless stated otherwise.

Synthesis of [Ti(POSS) 1.5] as 5% by wt. of Master Batch in Polyol with Tetraethyl Orthotitanate To a solution of isobutyltrisilanol-POSS (47 g, 59 mmol) in 190 ml of toluene is added tetraethyl orthotitanate (44 mmol). The reaction mixture is heated to 50 to 67° C. for 60 to 180 minutes. Then Daltocel F 428 (950 g) is added to the reaction mixture. Removal of the solvent toluene at 80° C. to 150° C. for an additional 30 to 80 minutes yields a clear liquid without insoluble residues as a concentrate (master batch).

In addition to toluene, it is possible to use conventional aprotic solvents, such as hexane. Furthermore, there is the option that the amount of titanium propoxide may be varied, in order to obtain more ratios of POSS and titanium. The solvent exchange can also be carried out under reduced pressure.

The data given in the examples are in percentages by weight of the individual components, unless stated otherwise.

EXAMPLE 1

α,ω-dihydroxypolyorganosiloxane (30 to 70% by wt.), which is selected from α,ω-dihydroxyl-terminated polydimethylsiloxanes, α,ω-dihydroxyl-terminated polydiethylsiloxanes or α,ω-dihydroxyl-terminated polydivinylsiloxanes, as well as α,ω-dihydroxyl-terminated polydiarylsiloxanes, such as, for example, α,ω-dihydroxyl-terminated polydiphenylsiloxanes. In this case preference is given to polyorganosiloxanes that have a kinematic viscosity of from 5,000 to 120,000 cSt (at 25° C.), in particular, those having a viscosity of from 20,000 to 100,000 cSt, and more preferably those having a viscosity of from 40,000 to 90,000 cSt. It is also possible to use mixtures of polydiorganosiloxanes having different viscosities, polydialkylsiloxane 50 to 150 cSt (15 to 45% by wt.); a crosslinker containing at least one silane (0.5 to 4.5% by wt.) and/or a mixture of at least two silanes (0.5 to 9% by wt.), of the general formula Si(R)$_m$(R$^a$)$_{4-m}$ were mixed under vacuum. Thereafter, a filler, preferably silica (5 to 15% by wt.), was optionally dispersed therein and stirred under vacuum until the mass is smooth. Then 0.001 to 0.5% by wt. of a metal silsesquioxane, according to claim 10, and optionally an adhesion promoter (0.5 to 2% by wt.), as described above, were incorporated by mixing under vacuum.

|   | Component | % by wt. |
|---|---|---|
| 1 | α,ω-dihydroxypolyorganosiloxane 20,000 to 80,000 cSt | 30 to 70 |
| 2 | polyalkylsiloxanes 50 to 150 cSt | 15 to 45 |
| 3 | crosslinker 1 | 0.5 to 4.5 |
| 4 | crosslinker 2 | 0.5 to 4.5 |
| 5 | filler | 5 to 15 |
| 6 | adhesion promoter | 0.5 to 2 |
| 7 | M3S catalyst | 0.001 to 0.5 |

EXAMPLE 2

α,ω-dihydroxydimethyl-polysiloxane 80,000 cSt (30 to 70% by wt.), polydimethylsiloxane 100 cSt (15 to 45% by wt.), a crosslinker containing at least one silane (0.5 to 4.5% by wt.) and/or a mixture of at least two silanes (0.5 to 9% by wt.) of the general formula Si(R)$_m$(R$^a$)$_{4-m}$, where each R$^a$ is selected independently of one another from the group consisting of a hydroxycarboxylic acid ester radical having the general structural formula (I):

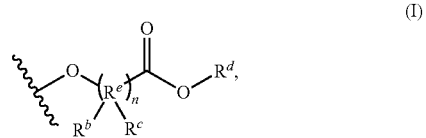

(I)

where
each $R^b$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each $R^c$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, $R^d$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, Re denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and n is an integer of from 1 to 10, a hydroxycarboxylic acid amide radical having the general structural formula (II):

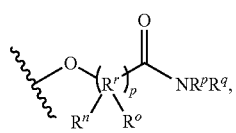

(II)

where
each $R^n$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, each $R^o$ denotes independently of one another H or an optionally substituted hydrocarbon radical having 1 to 20 carbon atoms, in particular, an optionally substituted, straight chain or branched C1 to C16 alkyl group or an optionally substituted C4 to C14 aryl group, $R^p$ and $R^q$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group, $R^r$ denotes C or an optionally substituted hydrocarbon radical having 1 to 20 carbon atoms, in particular, an optionally substituted saturated or partially unsaturated cyclic ring system having 4 to 14 C atoms or an optionally substituted aromatic group having 4 to 14 C atoms, and p is an integer of from 1 to 10, a carboxylic acid radical —O—C(O)—$R^f$, where $R^f$ denotes H or an optionally substituted hydrocarbon radical having 1 to 20 carbon atoms,
in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, an oxime radical —O—N=CR$^g$R$^h$, where R$^g$ and R$^h$ denote independently of one another H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, a carboxylic acid amide radical —N—($R^i$)—C(O)—$R^j$, where $R^i$ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and RJ denotes H or an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, and an alkoxy radical —$OR^k$, where $R^k$ denotes an optionally substituted hydrocarbon radical having 1 to 20 carbon atoms, in particular, an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group, were mixed under vacuum. Thereafter, a filler, preferably silica (5 to 15% by wt.), was optionally dispersed therein and stirred under vacuum until the mass was smooth. Then 0.006 to 0.17% by wt. of the catalyst IBU-POSS-Ti-OEt and optionally an adhesion promoter (0.5 to 2% by wt.) were incorporated by mixing under vacuum.

| | Component | % by wt. |
|---|---|---|
| 1 | α,ω-dihydroxydimethyl-polysiloxane 80,000 cSt | 30 to 70 |
| 2 | polydimethylsiloxane 100 cSt | 15 to 45 |
| 3 | crosslinker 1 | 0.5 to 4.5 |
| 4 | crosslinker 2 | 0.5 to 4.5 |
| 5 | silica | 5 to 15 |
| 6 | adhesion promoter | 0.5 to 2 |
| 7 | metal silsesquioxane | 0.001 to 0.5 |

All of the constituents of the silicone rubber compounds, described above, can be mixed together in one step.

In a preferred embodiment the silicone rubber compounds of the present invention are obtained in one step by way of the intermediately formed prepolymer in only one step. The formation of the prepolymer as well as the subsequent formation of the silicone rubber compounds can be formed in the presence of the catalyst of the invention without an additional purification or intermediate step.

In the case of the examples, described below, all of the parameters were determined by the test methods described below. All of the sealing materials, described below, were transparent and colorless and exhibited proper stability and notch resistance after 24 hours. Furthermore, the following sealing materials of all three test specimens passed in accordance with DIN EN ISO 8340, the conditioning method A on glass at an elongation of 100% of the initial length, with the elongation being maintained for 24 hours.

Comparison of the Tear Strength when Using Catalysts of the Invention (Examples 3 and 4) with Conventional Catalysts (Reference Example):

EXAMPLE 3

Crosslinker Mixture with Oxime Leaving Group

| | Component | % by wt. |
|---|---|---|
| 1 | α,ω-dihydroxydimethyl-polysiloxane 80,000 cSt | 53.5 |
| 2 | polydimethylsiloxane 100 cSt | 30.4 |
| 3 | vinyl-tris(2-pentanonoximo)silane | 2.2 |
| 4 | methyl-tris(2-pentanonoximo)silane | 2.2 |
| 5 | pyrogenic silica, untreated BET surface 130 to 150 m$^2$/g | 10.6 |
| 6 | adhesion promoter based on N (2 aminoethyl)-3-aminopropyltrimethoxysilane (DAMO) | 1.0 |
| 7 | catalyst IBU-POSS-Ti—OEt | 0.08 |

α,ω-dihydroxydimethyl-polysiloxane 80,000 cSt, PDMS 100 cSt and vinyl-tris(2-pentanonoximo)silane were mixed under vacuum. Then methyl-tris(2-pentanonoximo)silane was admixed thereto under vacuum. Thereafter, the silica was dispersed therein and stirred under vacuum until the mass was smooth. Then the catalyst IBU-POSS-Ti-OEt (VII) and the oligomeric adhesion promoter based on N-(2-aminoethyl)-3-aminopropyltrimethoxysilane (DAMO) were incorporated by mixing under vacuum. The product was characterized by a skinning time of 8 minutes and a tack-free time of 20 minutes. The sealing material had good adhesion on all tested materials, i.e., glass, aluminum, PVC, sheet metal, steel, concrete, wood, painted wood, varnished wood, polyamide and Al/Mg alloy.

The determined Shore A hardness was 23. Even after 4 weeks of storage at 60° C., the sealing material was stable (Shore A: 21) and colorless. The extrusion using a 2 mm diameter die at 5 bar and 30 seconds was 14.0. Furthermore the sealing material showed superb properties:

| Property | Sealing Material |
|---|---|
| early load bearing capacity | 60 min. |
| complete curing on glass (9 mm) | 3 d |
| DIN EN ISO 8339 | 0.33 |
| tensile stress value at 100% elongation (N/mm$^2$) | |
| DIN EN ISO 8339 | 0.63 |
| secant modulus at elongation at break (N/mm$^2$) | |
| DIN EN ISO 8339 | 385% |
| elongation at break | |
| DIN EN ISO 7389 | 92% |
| average elastic recovery | |
| DIN 53504 | 0.89 |
| tear strength (N/mm$^2$) | |
| DIN EN ISO 53504 | 790% |
| elongation at break | |

EXAMPLE 4

Crosslinker Mixture with Oxine Leaving Group

| | Component | % by wt. |
|---|---|---|
| 1 | α,ω dihydroxydimethyl-polysiloxane 80,000 cSt | 53.5 |
| 2 | polydimethylsiloxane 100 cSt | 30.4 |
| 3 | vinyl-tris(2-pentanonoximo)silane | 2.2 |
| 4 | methyl-tris(2-pentanonoximo)silane | 2.2 |
| 5 | pyrogenic silica, untreated BET surface 130 to 150 m$^2$/g | 10.6 |
| 6 | adhesion promoter based on N (2 aminoethyl)-3-aminopropyltrimethoxysilane (DAMO) | 1.0 |
| 7 | catalyst IBU-POSS-Ti—OEt | 0.08 |

α,ω-dihydroxydimethyl-polysiloxane 80,000 cSt, PDMS 100 cSt and vinyl-tris(2-pentanonoximo)silane were mixed under vacuum. Then methyl-tris(2-pentanonoximo)silane was admixed thereto under vacuum. Thereafter, the silica was dispersed therein and stirred under vacuum until the mass was smooth. Then the catalyst octyl-POSS-Ti-OEt and the oligomeric adhesion promoter based on N-(2-aminoethyl)-3-aminopropyltrimethoxysilane (DAMO) were incorporated by mixing under vacuum. The product was characterized by a skinning time of 8 minutes and a tack-free time of 20 minutes. The sealing material had good adhesion on all tested materials, i.e., glass, aluminum, PVC, sheet metal, steel, concrete, wood, painted wood, varnished wood, polyamide and Al/Mg alloy.

The determined Shore A hardness was 24. Even after 4 weeks of storage at 60° C., the sealing material was stable (Shore A: 21) and colorless. The extrusion using a 2 mm diameter die at 5 bar and 30 seconds was 12.0 g. Furthermore, the sealing material showed superb properties:

| Property | Sealing Material |
|---|---|
| early load bearing capacity | 60 min. |
| complete curing on glass (9 mm) | 4 d |
| DIN EN ISO 8339 | 0.38 |
| tensile stress value at 100% elongation (N/mm$^2$) | |
| DIN EN ISO 8339 | 0.71 |
| secant modulus at elongation at break (N/mm$^2$) | |
| DIN EN ISO 8339 | 350% |
| elongation at break | |
| DIN EN ISO 7389 | 94% |
| average elastic recovery | |
| DIN 53504 | 0.97 |
| tear strength (N/mm$^2$) | |
| DIN EN ISO 53504 | 730% |
| elongation at break | |

REFERENCE EXAMPLE A

Crosslinker Mixture with Oxime Leaving Groups

| | Component | % by wt. |
|---|---|---|
| 1 | α,ω-dihydroxydimethyl-polysiloxane 80,000 cSt | 53.0 |
| 2 | polydimethylsiloxane 100 cSt | 31.4 |
| 3 | vinyl-tris(2-pentanonoximo)silane | 1.3 |
| 4 | methyl-tris(2-pentanonoximo)silane | 3.0 |
| 5 | pyrogenic silica, untreated BET surface 130 to 150 m$^2$/g | 10.5 |
| 6 | adhesion promoter based on N (2 aminoethyl)-3-aminopropyltrimethoxysilane (DAMO) | 0.65 |
| 7 | octyl tin catalyst | 0.12 |

α,ω-dihydroxydimethyl-polysiloxane 80,000 cSt, PDMS 100 cSt and vinyl-tris(2-pentanonoximo)silane were mixed under vacuum. Then methyl-tris(2-acetonoximo)silane was also admixed thereto under vacuum. Thereafter, the silica was dispersed therein and stirred under vacuum until the mass was smooth. Then the octyl tin catalyst and the oligomeric adhesion promoter based on N-(2-aminoethyl)-

3-aminopropyltrimethoxysilane (DAMO) were incorporated by mixing under vacuum. The product was characterized by a skinning time of 9 minutes and a tack-free time of 23 minutes. The sealing material had good adhesion on all of the tested materials, i.e., glass, aluminum, PVC, sheet metal, steel, concrete, wood, painted wood, varnished wood, polyamide and Al/Mg alloy.

The determined Shore A hardness was 26. Even after 4 weeks of storage at 60° C., the sealing material was stable (Shore A: 23) and colorless. The extrusion using a 2 mm diameter die at 5 bar and 30 seconds was 18.0 g. Furthermore, the sealing material showed the following properties:

| Property | Sealing Material |
| --- | --- |
| early load bearing capacity | 170 min. |
| complete curing on glass (9 mm) | 5 d |
| DIN EN ISO 8339 | 0.38 |
| tensile stress value at 100% elongation (N/mm$^2$) | |
| DIN EN ISO 8339 | 0.57 |
| secant modulus at elongation at break (N/mm$^2$) | |
| DIN EN ISO 8339 | 280% |
| elongation at break | |
| DIN EN ISO 7389 | 96% |
| average elastic recovery | |
| DIN 53504 | 0.93 |
| tear strength (N/mm$^2$) | |
| DIN EN ISO 53504 | 660% |
| elongation at break | |

Preparation of Individual Silicone Rubber Compounds

EXAMPLE 5

Crosslinker Mixture with Oxime Leaving Group

| | Component | % by wt. |
| --- | --- | --- |
| 1 | α,ω-dihydroxydimethyl-polysiloxane 80,000 cSt | 53.5 |
| 2 | polydimethylsiloxane 100 cSt | 30.4 |
| 3 | vinyl-tris(2-pentanonoximo)silane | 0.85 |
| 4 | ethyl-tris(acetonoximo)silane | 3.55 |
| 5 | pyrogenic silica, untreated BET surface 130 to 150 m$^2$/g | 10.6 |
| 6 | oligomeric adhesion promoter based on DAMO | 1.0 |
| 7 | catalyst IBU-POSS-Ti-OEt | 0.08 |

α,ω-dihydroxydimethyl-polysiloxane 80,000 cSt, PDMS 100 cSt, ethyl-tris(acetonoximo)silane and vinyl-tris(2-pentanonoximo)silane were mixed under vacuum. Thereafter, the silica was dispersed therein and stirred under vacuum until the mass was smooth. Then the catalyst IBU-POSS-Ti-Et (VII) and the oligomeric adhesion promoter based on N-(2-aminoethyl)-3-aminopropyltrimethoxysilane (DAMO) were incorporated by mixing under vacuum. The product was transparent and colorless. It was characterized by a skinning time of 10 minutes and a tack-free time of 40 minutes. The sealing material had good adhesion on all of the tested materials, i.e., glass, aluminum, PVC, sheet metal, steel, concrete, wood, painted wood, varnished wood, polyamide and Al/Mg alloy.

The determined Shore A hardness was 22. Even after 4 weeks of storage at 60° C., the sealing material was stable (Shore A: 21) and colorless. The extrusion using a 2 mm diameter die at 5 bar and 30 seconds was 12.0 g. Furthermore, the sealing material showed superb properties:

| Property | Sealing Material |
| --- | --- |
| early load bearing capacity | 70 min. |
| complete curing on glass (9 mm) | 4 d |
| DIN EN ISO 8339 | 0.35 |
| tensile stress value at 100% elongation (N/mm$^2$) | |
| DIN EN ISO 8339 | 0.69 |
| secant modulus at elongation at break (N/mm$^2$) | |
| DIN EN ISO 8339 | 435% |
| elongation at break | |
| DIN EN ISO 7389 | 93% |
| average elastic recovery | |
| DIN 53504 | 0.83 |
| tear strength (N/mm$^2$) | |
| DIN EN ISO 53504 | 835% |
| elongation at break | |

EXAMPLE 6

Crosslinker Mixture with Oxime Leaving Group

| | Component | % by wt. |
| --- | --- | --- |
| 1 | α,ω-dihydroxydimethyl-polysiloxane 80,000 cSt | 53.5 |
| 2 | polydimethylsiloxane 100 cSt | 30.4 |
| 3 | vinyl-tris(2-pentanonoximo)silane | 2.2 |
| 4 | methyl-tris(2-pentanonoximo)silane | 2.2 |
| 5 | pyrogenic silica, untreated BET surface 130 to 150 m$^2$/g | 10.6 |
| 6 | oligomeric adhesion promoter based on DAMO | 1.0 |
| 7 | catalyst IBU-POSS-Ti-OEt | 0.006 |

α,ω-dihydroxydimethyl-polysiloxane 80,000 cSt, PDMS 100 cSt and vinyl-tris(2-pentanonoximo)silane were mixed under vacuum. Then methyl-tris(2-pentanonoximo)silane was admixed thereto under vacuum. Thereafter, the silica was dispersed therein and stirred under vacuum until the mass was smooth. Then the catalyst IBU-POSS-Ti-OEt (VII) and the oligomeric adhesion promoter based on N-(2-aminoethyl)-3-aminopropyltrimethoxysilane (DAMO) were incorporated by mixing under vacuum. The product was transparent and colorless. It was characterized by a skinning time of 8 minutes and a tack-free time of 30 minutes. The sealing material had good adhesion on all of the tested materials, i.e., glass, aluminum, PVC, sheet metal, steel, concrete, wood, painted wood, varnished wood, polyamide and Al/Mg alloy.

The determined Shore A hardness was 26. Even after 4 weeks of storage at 60° C., the sealing material was stable (Shore A: 24) and colorless. The extrusion using a 2 mm diameter die at 5 bar and 30 seconds was 12.0 g. Furthermore, the sealing material showed superb properties:

| Property | Sealing Material |
| --- | --- |
| Early load bearing capacity | 60 min. |
| Complete curing on glass (9 mm) | 3 d |
| DIN EN ISO 8339 | 0.38 |
| Tensile stress value at 100% elongation (N/mm$^2$) | |
| DIN EN ISO 8339 | 0.68 |
| secant modulus at elongation at break (N/mm$^2$) | |
| DIN EN ISO 8339 | 340% |
| elongation at break | |
| DIN EN ISO 7389 | 95% |
| average elastic recovery | |
| DIN 53504 | 0.68 |
| Tear strength (N/mm$^2$) | |
| DIN EN ISO 53504 | 555% |
| elongation at break | |

EXAMPLE 7

Crosslinker with Carboxylic Acid Leaving Group

| Component | % by wt. |
|---|---|
| 1 α,ω-dihydroxydimethyl-polysiloxane 80,000 cSt | 55.4 |
| 2 polydimethylsiloxane 100 cSt | 31.1 |
| 3 propyltriacetoxysilane | 4.5 |
| 4 di-tertbutoxy-diacetoxysilane BDAC | 0.25 |
| 5 pyrogenic silica, untreated BET surface 130 to 150 m$^2$/g | 8.5 |
| 6 catalyst IBU-POSS-Ti-OEt | 0.04 |

Polymer 80,000 cSt, PDMS 100 cSt and propyltriacetoxysilane were mixed under vacuum. Then the adhesion promoter BDAC was also admixed thereto under vacuum. Thereafter, the silica was dispersed therein and stirred under vacuum until the mass was smooth. Then the catalyst IBU-POSS-Ti-OEt (VII) was incorporated by mixing under vacuum. The product was transparent and colorless. It was characterized by a skinning time of minutes and a tack-free time of 40 minutes. The sealing material had good adhesion on all of the tested materials, i.e., glass, aluminum, PVC, sheet metal, steel, [sic] wood, painted wood, varnished wood, polyamide and Al/Mg alloy.

The determined Shore A hardness was 23. Even after 4 weeks of storage at 60° C., the sealing material was stable (Shore A: 23) and colorless. The extrusion using a 2 mm diameter die at 5 bar and 30 seconds was 25.0 g. Furthermore, the sealing material showed superb properties:

| Property | Sealing Material |
|---|---|
| early load bearing capacity | 40 min. |
| complete curing on glass (9 mm) | 3 d |
| DIN EN ISO 8339 tensile stress value at 100% elongation (N/mm$^2$) | 0.37 |
| DIN EN ISO 8339 secant modulus at elongation at break (N/mm$^2$) | 0.49 |
| DIN EN ISO 8339 elongation at break | 210% |
| DIN EN ISO 8340 conditioning method A on glass | 24 h/100% elongation at break, all 3 test specimens passed |
| DIN EN ISO 7389 average elastic recovery | 97% |
| DIN 53504 tear strength (N/mm$^2$) | 1.24 |
| DIN EN ISO 53504 elongation at break | 1150% |

EXAMPLE 8

Crosslinker with Carboxylic Acid Leaving Group

| Component | % by wt. |
|---|---|
| 1 α,ω-dihydroxydimethyl-polysiloxane 80,000 cSt | 55.4 |
| 2 polydimethylsiloxane 100 cSt | 31.1 |
| 3 propyltriacetoxysilane | 4.5 |
| 4 di-tertbutoxy-diacetoxysilane BDAC | 0.25 |
| 5 pyrogenic silica, untreated BET surface 130 to 150 m$^2$/g | 8.5 |
| 6 catalyst IBU-POSS-Ti-OEt | 0.0125 |

α,ω-dihydroxydimethyl-polysiloxane 80,000 cSt, PDMS 100 cSt and propyltriacetoxysilane were mixed under vacuum. Then the adhesion promoter BDAC was also admixed thereto under vacuum. Thereafter, the silica was dispersed therein and stirred under vacuum until the mass was smooth. Then the catalyst IBU-POSS-Ti-OEt (VII) was incorporated by mixing under vacuum. The product was transparent and colorless. It was characterized by a skinning time of 8 minutes and a tack-free time of 40 minutes. The sealing material had good adhesion on all of the tested materials, i.e., glass, aluminum, PVC, sheet metal, steel, wood, painted wood, varnished wood, polyamide and Al/Mg alloy.

The determined Shore A hardness was 23. Even after 4 weeks of storage at 60° C., the sealing material was stable (Shore A: 23) and colorless. The extrusion using a 2 mm diameter die at 5 bar and 30 seconds was 25.0 g. Furthermore, the sealing material showed superb properties:

| Property | Sealing Material |
|---|---|
| early load bearing capacity | 40 min. |
| complete curing on glass (9 mm) | 3 d |
| DIN EN ISO 8339 Tensile stress value at 100% elongation (N/mm$^2$) | 0.37 |
| DIN EN ISO 8339 secant modulus at elongation at break (N/mm$^2$) | 0.49 |
| DIN EN ISO 8339 elongation at break | 210% |
| DIN EN ISO 7389 average elastic recovery | 97% |
| DIN 53504 tear strength (N/mm$^2$) | 1.24 |
| DIN EN ISO 53504 elongation at break | 1150% |

EXAMPLE 9

Crosslinker with Hydroxycarboxylic Acid Leaving Groups

| Component | % by wt. |
|---|---|
| 1 α,ω-dihydroxydimethyl-polysiloxane 80,000 cSt | 55.0 |
| 2 polydimethylsiloxane 100 cSt | 26.7 |
| 3 methyl-tris salicylic acid ethylhexyl ester silane | 4.0 |
| 4 propyl-tris salicylic acid ethylhexyl ester silane | 4.0 |
| 5 3 aminopropyltriethoxysilane (AMEO) | 0.1 |
| 6 pyrogenic silica, untreated BET surface 130 to 150 m$^2$/g | 8.5 |
| 7 catalyst IBU-POSS-Ti-OEt | 0.07 |
| 8 tris(3 trimethoxysilylpropyl)isocyanurate | 1.2 |
| 9 DMAPTMS | 0.4 |

α,ω-dihydroxydimethyl-polysiloxane 80,000 cSt, PDMS 100 cSt, methyl-tris-salicylic acid ethylhexyl ester silane and propyl-tris-salicylic acid ethylhexyl ester silane were mixed under vacuum. Then AMEO was also admixed thereto under vacuum. Thereafter, the silica was dispersed therein and stirred under vacuum until the mass was smooth. Then the catalyst IBU-POSS-Ti-OEt (VII) and the adhesion promoter tris(3-trimethoxysilylpropyl)isocyanurate and the adhesion promoter dimethylaminopropyltrimethoxysilane (DMAPTMS) were incorporated by mixing under vacuum.

The product was characterized by a skinning time of 7 minutes and a tack-free time of 120 minutes. The sealing material had good adhesion on all tested materials, i.e., glass, aluminum, PVC, sheet metal, steel, wood, painted wood, varnished wood, polyamide and Al/Mg alloy.

The determined Shore A hardness was 27. Even after 4 weeks of storage at 60° C., the sealing material was stable (Shore A: 24) and colorless. The extrusion using a 2 mm diameter die at 5 bar and 30 seconds was 12.0 g. Furthermore, the sealing material showed superb properties:

| Property | Sealing Material |
|---|---|
| early load bearing capacity | 20 min. |
| complete curing on glass (9 mm) | 5 d |
| DIN EN ISO 8339 | 0.33 |
| tensile stress value at 100% elongation (N/mm$^2$) | |
| DIN EN ISO 8339 | 0.52 |
| secant modulus at elongation at break (N/mm$^2$) | |
| DIN EN ISO 8339 | 285% |
| elongation at break | |
| DIN EN ISO 7389 | 96% |
| average elastic recovery | |
| DIN 53504 | 0.57 |
| tear strength (N/mm$^2$) | |
| DIN EN ISO 53504 | 460% |
| elongation at break | |

REFERENCE EXAMPLE B

I) Starting Materials:

| | Substance | Amount (g) |
|---|---|---|
| 1 | Polymer 20,000 cSt (α,ω-dihydroxy-dimethyl-polysiloxane) | 380 |
| 2 | Crosslinker: tetra(glycolic acid n-butyl ester)silane* | 5 |
| 7 | Catalyst: amberlite IRA-67 (weak anion exchange resin with a gel type acrylic matrix | 0.4 |

*Synthesis of Tetra(glycolic acid n-butyl ester)silane
A 1,000 ml three-necked flask is filled with 222 g of toluene, 67.6 g of triethylamine and 90.6 g of glycolic acid n-butyl ester under a nitrogen atmosphere. Then 26.8 g of tetrachlorosilane are metered in with stirring. In this case the reaction temperature is maintained at <35° C. by cooling with a water bath. Upon metering, the mixture is stirred for an additional 30 min. at 30° C., and then the hydrochloride that was formed is removed by filtration.
Then lastly the solvent toluene is separated by distillation in vacuo. 86 g (98.5% of the theoretical value) of a yellowish liquid, which consists largely of Si(OCH2COO-n-C4H9)4, are obtained.

II) Preparation:

Polymer 80,000, crosslinker and catalyst are mixed under vacuum. The resulting mixture is then tapped under exclusion of atmospheric moisture.

Properties of the Sealing Material after Exposure to Air.

| Optical characteristics | Colorless, transparent |
|---|---|
| Skinning time | 40 min. |
| Tack-free time | more than 7 days |

More in-depth studies could not be conducted, since the mixture does not cure completely.

General Implementation of the Test Methods:

1. Determining the Tack-Free Time of Silicone Sealing Materials

In order to determine the tack-free time, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. The current time is read. At appropriate intervals the tack-free time of the sealing material to be determined is determined by gently touching the silicone surface with a clean finger. If the sealing material is tack-free, then the current time is read again.

2. Determining the Extrusion of Silicone Sealing Materials

A filled and sealed cartridge that is ready for use (service life of the sealing material after compounding for at least 24 hours) is inserted into a compressed air gun for silicone cartridges, and a suitable cartridge tip is screwed on. The compressed air gun is connected to the compressed air supply; and the pressure gauge is set to a pressure of 5 bar. Then a small amount of silicone is sprayed on a wiping paper from the silicone cartridge, so that the cartridge tip is filled completely with silicone. Then an aluminum bowl is placed on the top-loading balance and tared. Now silicone is sprayed on the bowl for exactly 30 seconds, and then lastly the weight is read on the top-loading balance.

3. Determining the Stability of Silicone Sealing Materials

In order to determine the stability, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then a worm shape is sprayed on a cardboard (diameter approx. 3 cm) in a circular manner. The cardboard with the silicone worm is now placed vertically, and the current time is read.

After 30 minutes, it is observed whether the silicone worm has the original shape or whether the worm has flowed downwards. If the worm shape has not changed, then the silicone sealing material is stable.

4. Determining the Complete Curing of Silicone Sealing Materials

In order to determine the complete curing, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. At appropriate intervals (days) a small crosspiece is carefully cut off from the silicone with a knife, and the curing of the sealing material is assessed. If the inner portion of the body of the sealing material is still sticky and gel-like, then the sealing material has still not cured completely, and the determination procedure is repeated. If the sealing material has cured completely, then the curing time is recorded in days. If the sealing material is still sticky after 7 days after dispensing, then the criterion regarding the complete curing shall be judged to be deficient.

5. Determining the Adhesion of Silicone Sealing Materials

In order to determine the adhesion, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then a silicone button is sprayed on a suitably cleaned carrier material (for example, glass, aluminum, wood, plastic, concrete, natural stone, etc.). After the sealing material has cured completely (about 48 h), the silicone button is pulled with the fingers to see whether the silicone has peeled off again from the carrier material or whether the silicone has formed an intimate bond with the carrier material. If the silicone button can be easily peeled off or can be pulled off only with difficulty or not at all from the carrier material, then the adhesive property shall be rated as bad, average or good.

6. Determining the Odor of Silicone Sealing Materials

A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. Then the silicone sealing material is assessed with respect to its odor.

7. Determining the Aspect of Silicone Sealing Materials

A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. Then the silicone sealing material is assessed by visual inspection for appearance, color and smoothness.

8. Determining the Skinning Time of Silicone Sealing Materials

In order to determine the skinning time, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. At appropriate intervals the skinning of the sealing material to be determined is determined with a clean finger by applying a slight pressure on the silicone surface. If the sealing material forms a skin on its surface, so that no silicone residues will stick to the finger, then the measured time is read on the stopwatch.

9. Tensile Test with Dumbbell Specimen S1 in Accordance with DIN 53504

In order to determine the silicone to be tested, the associated test number of the silicone cartridge and the test date must be recorded in the protocol. The service life of the sealing material after compounding must be at least 24 hours in the cartridge. The mold is wetted with detergent to prevent silicone buildup on the metal. A filled and sealed cartridge that is ready for use is inserted into a gun for silicone cartridges. The tip of the cartridge is removed. Then the silicone is sprayed on the die for the dumbbell specimen S 1 over the length and height of the milled mold and immediately smoothed out with a trowel. After at least 24 hours the curing of the silicone is checked by lifting the test specimen from the die. The surface must no longer be sticky. The dumbbell specimen has to be visually flawless without air pockets or inclusions of foreign matter and without cracks. After removal from die, the test specimen is marked with the test number. In the tensile tester T 300, the tension clamps have to be used for the dumbbell specimen S 1. The testable dumbbell specimen is clamped between the upper and lower clamps in such a way that the bar indicates exactly 26 mm of initial length to be measured. The measured data or, more specifically, the measuring marks are reset to zero in the relaxed state. By pressing the start button, the elongation of the test specimens or, more specifically, the display of their measured value begins. The device shuts off automatically after the test specimen tears. The measured values remain displayed and can be read directly.

10. Tensile Test with H Test Specimen in Accordance with DIN 8339

In order to determine the silicone to be tested, the associated test number of the silicone cartridge and the test date must be recorded in the protocol. The service life of the sealing material after compounding must be at least 24 hours in the cartridge.

A filled and sealed cartridge that is ready for use is inserted into a gun for silicone cartridges. The tip of the cartridge is removed. Then the silicone is sprayed on the die over the length and height of the milled mold and immediately smoothed out with a trowel. Thereafter the test specimen is stored for 28 days under standard conditions. Before the tensile test, the test specimen is checked by visual inspection. The test specimen may not show any air pockets or cracks.

In the tensile tester MFC T 300, the tension clamps have to be used for the H test specimen. The test piece is clamped between the upper and lower clamps in such a way that the distance is 12 mm. The measured data or, more specifically, the measuring marks are reset to zero in the relaxed state. By pressing the start button, the elongation of the test specimens or, more specifically, the display of their measured value begins.

The device shuts off automatically after the test specimen tears. The measured values remain displayed and can be read directly.

11. Tensile Test with H Test Specimen in accordance with DIN 8340

In order to determine the silicone to be tested, the associated test number of the silicone cartridge and the test date must be recorded in the protocol. The service life of the sealing material after compounding must be at least 24 hours in the cartridge. A filled and sealed cartridge that is ready for use is inserted into a gun for silicone cartridges. The tip of the cartridge is removed. Then the silicone is sprayed on the die over the length and height of the mold and immediately smoothed out with a trowel. Thereafter the test specimen is stored for 28 days under standard conditions. Before the tensile test, the test specimen is checked by visual inspection. The test specimen may not show any air pockets or cracks.

In the tensile tester MFC T 300, the tension clamps have to be used for the H test specimen. The test piece is clamped between the upper and lower clamps in such a way that the distance is 12 mm. The measured data or, more specifically, the measuring marks are reset to zero in the relaxed state. By pressing the start button, the elongation of the test specimens or, more specifically, the display of their measured value begins. The device shuts off automatically after the test specimen tears. The measured values remain displayed and can be read directly.

12. Determining the Storage Stability of Silicone Sealing Materials

A filled and sealed cartridge that is ready for use is placed in the heated drying oven. According to the test method protocol, the silicone sealing material is stored in the heated drying oven at a suitable temperature for a specified period of several weeks. When the storage time has elapsed, the cartridge is inserted into a gun for silicone cartridges. Then an appropriate amount of silicone is sprayed on an absorbent pad that has been laid out. The silicone is spread promptly with the trowel, so that a continuous silicone strip is formed. The silicone sealing material is then assessed for PA-E0002 and PA-E0010.

13. Determining the Early Load Bearing Capacity of Silicone Sealing Materials

In order to determine the early load bearing capacity, the temperature as well as the atmospheric moisture when dispensing the sealing material must be determined by means of a suitable device and recorded in the appropriate protocol. A filled and sealed cartridge that is ready for use (service life of the sealing material after compounding for at least 24 hours) is inserted into a gun for silicone cartridges. Then horizontal lines are drawn on the cardboard at intervals of 3 cm and then cut. Then an appropriate amount of silicone is sprayed on the cardboard. The silicone is spread promptly with the trowel, so that a continuous silicone strip is formed. The current time is read. At equal intervals of 15 minutes the cardboard is bent to form a right angle, starting at the first line; and the surface of the silicone is evaluated at the kink point. If the silicone is completely or only partially cracked at the kink point, the determination procedure is repeated at the next 3 cm line after 15 more minutes. If the silicone is elastic at the kink point and no crack is detectable, then the silicone can be subjected to a load at an early stage. The current time is read again.

14. Determining the Shore Hardness of Silicone Sealing Materials

A filled and sealed cartridge that is ready for use (service life of the sealing material after compounding for at least 24 hours) is inserted into a gun for silicone cartridges. Then an appropriate amount of silicone is sprayed on a clean glass plate. The silicone is spread promptly with the trowel, so that a continuous silicone strip is formed. In the case of a fully cured sealing material (see PA-E0008), the Shore hardness determination device is placed with both hands totally flat on the silicone surface, and the maximum value of the Shore hardness is read. The measurement is repeated at least 5 times at various points on the silicone surface, and an average of the individual measurements is formed.

The invention claimed is:

1. A composition obtained by mixing the following components:
   a. at least one silicone compound having the general formula HO—(SiR$^l$R$^m$O)$_o$—H, wherein R$^l$ and R$^m$ denote independently of one another an optionally substituted hydrocarbon radical having 1 to 20 carbon atoms and o is an integer of from 5 to 4,000,
   b. a catalyst, wherein the catalyst contains at least one metal siloxane-silanol(-ate) compound, and
   c. at least one crosslinker having the general formula Si(R)$_m$(R$^a$)$_{4-m}$, wherein each R denotes independently of one another an optionally substituted hydrocarbon radical having 1 to 20 carbon atoms,
   m is an integer of from 0 to 2,
   each R$^a$ is selected independently of one another from the group consisting of
      a hydroxycarboxylic acid ester radical having the general structural formula (I):

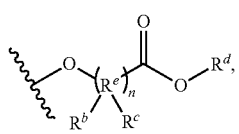

wherein
each R$^b$ denotes independently of one another H or an optionally substituted hydrocarbon radical having 1 to 20 carbon atoms,
each R$^c$ denotes independently of one another H or an optionally substituted hydrocarbon radical having 1 to 20 carbon atoms,
R$^d$ denotes an optionally substituted hydrocarbon radical having 1 to 20 carbon atoms,
R$^e$ denotes C or an optionally substituted hydrocarbon radical having 1 to 20 carbon atoms, and
n is an integer of from 1 to 10,
   a hydroxycarboxylic acid amide radical having the general structural formula (II):

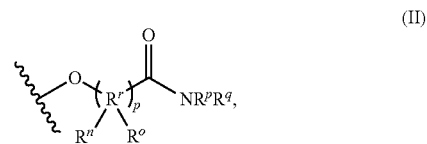

wherein
each R$^n$ denotes independently of one another H or an optionally substituted hydrocarbon radical having 1 to 20 carbon atoms,
each R$^o$ denotes independently of one another H or an optionally substituted hydrocarbon radical having 1 to 20 carbon atoms,
R$^p$ and R$^q$ denote independently of one another H or an optionally substituted hydrocarbon radical having 1 to 20 carbon atoms,
R$^r$ denotes C or an optionally substituted hydrocarbon radical having 1 to 20 carbon atoms, and
p is an integer of from 1 to 10,
   a carboxylic acid radical —O—C(O)—R$^f$, wherein R$^f$ denotes H or an optionally substituted hydrocarbon radical having 1 to 20 carbon atoms,
   an oxime radical —O—N=CR$^g$R$^h$, wherein R$^g$ and R$^h$ denote independently of one another H or an optionally substituted hydrocarbon radical having 1 to 20 carbon atoms, and
   a carboxylic acid amide radical —N—(R$^i$)—C(O)—R$^j$, wherein R$^i$ denotes H or an optionally substituted hydrocarbon radical having 1 to 20 carbon atoms, and R$^j$ denotes H or an optionally substituted hydrocarbon radical having 1 to 20 carbon atoms.

2. The composition of claim 1, wherein the metal siloxane-silanol(-ate) compound is in a molar concentration in the range of from 0.00001 to 0.01 mol/kg, based on the total weight of the composition.

3. The composition of claim 2, wherein the metal siloxane-silanol(-ate) compound is in a molar concentration in the range of from 0.00005 to 0.005 mol/kg, based on the total weight of the composition.

4. The composition of claim 1, wherein the metal siloxane-silanol(-ate) compound is present at a proportion by weight of from 0.001 to 0.5%.

5. The composition of claim 1, wherein the molar ratio of crosslinker of the general formula Si(R)$_m$(R$^a$)$_{4-m}$, wherein the crosslinker may also be present as a crosslinker mixture, to M3S catalyst is 20 to 2,000.

6. The composition of claim 1, wherein the metal siloxane-silanol(-ate) compound is present as a monomer, oligomer and/or polymer, and wherein the metal or metals is/are present terminally and/or within the chain.

7. The composition of claim 1, wherein the metal siloxane-silanol(-ate) compound contains an oligomeric metal silsesquioxane.

8. The composition of claim 7, wherein the metal silsesquioxane has the general formula $R^*_q Si_r O_s M_t$, wherein each $R^*$ is selected independently of one another from the group consisting of optionally substituted C1 to C20 alkyl, optionally substituted C3 to C6 cycloalkyl, optionally substituted C2 to C20 alkenyl, optionally substituted C6 to C10 aryl, —OH and —O—(C1 to C10 alkyl),
- each M is selected independently of one another from the group consisting of s and p block metals, d and f block transition metals, lanthanide and actinide metals and semimetals,
- q is an integer of from 4 to 19,
- r is an integer of from 4 to 10,
- s is an integer of from 8 to 30, and
- t is an integer of from 1 to 8.

9. The composition of claim 8, wherein each M is selected independently of one another from the group consisting of metals of the 1st, 2nd, 3rd, 4th, 5th, 8th, 10th and 11th subgroup and metals of the 1st, 2nd, 3rd, 4th and 5th main group.

10. The composition of claim 7, wherein the metal silsesquioxane has the general formula (III)

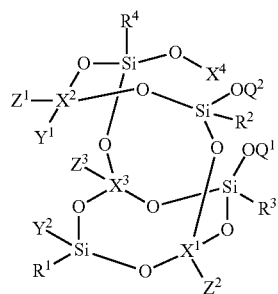

(III)

wherein
$X^1$, $X^2$ and $X^3$ are selected independently of one another from Si or $M^1$, wherein $M^1$ is selected from the group consisting of Zn, Ti, Zr, Hf, V, Fe, Sn and Bi,
$Z^1$, $Z^2$ and $Z^3$ are selected independently of one another from the group consisting of $L^2$, $R^5$, $R^6$ and $R^7$, wherein $L^2$ is selected from the group consisting of —OH and —O—(C1 to C10 alkyl), or wherein $L^2$ is selected from the group consisting
of —OH, —O-methyl, —O-ethyl, —O-propyl, —O-butyl, —O-octyl, —O-isopropyl, and —O-isobutyl;
$R^1$, $R^2$, $R^3$, $R^4$, $R^5$, $R^6$ and $R^7$ are selected independently of one another from the group consisting of optionally substituted C1 to C20 alkyl, optionally substituted C3 to C8 cycloalkyl, optionally substituted C2 to C20 alkenyl and optionally substituted C5 to C10 aryl;
$Y^1$ and $Y^2$ denote independently of one another —O—$M^2$-$L^3_A$, or $Y^1$ and $Y^2$
are taken together and together denote —O—$M^2(L^3_A)$—O— or —O—,
wherein $L^3$ is selected from the group consisting of —OH and —O—(C1 to C10 alkyl), or wherein $L^3$ is selected from the group consisting
of —OH, —O-methyl, —O-ethyl, —O-propyl, —O-butyl, —O-octyl, —O-isopropyl, and —O-isobutyl, and wherein $M^2$ is selected from the group consisting of s and p block metals, d and f block transition metals, lanthanide and actinide metals and semimetals, and
$X^4$ denotes -$M^3 L^1_A$ or $M^3$, and $Q^1$ and $Q^2$ denote H or in each case a single bond linked to $M^3$, wherein $L^1$ is selected from the group consisting of —OH and —O—(C1 to C10 alkyl), or wherein $L^1$ is selected from the group consisting
of —OH, —O-methyl, —O-ethyl, —O-propyl, —O-butyl, —O-octyl, —O-isopropyl, and —O-isobutyl, and wherein $M^3$ is selected from the group consisting of s and p block metals, d and f block transition metals, lanthanide and actinide metals and semimetals, or
$X^4$ denotes -$M^3 L^1_A$ and $Q^2$ denotes H or a single bond linked to $M^3$,
and $Q^1$ denotes H, $M^4 L^4_A$ or —$SiR^8$, wherein $M^4$ is selected from the group consisting of s and p block metals, d and f block transition metals, lanthanide and actinide metals and semimetals,
and wherein $L^4$ is selected from the group consisting of —OH and —O—(C1 to C10 alkyl), or wherein $L^4$ is selected from the group consisting
of —OH, —O-methyl, —O-ethyl, —O-propyl, —O-butyl, —O-octyl, —O-isopropyl, and —O-isobutyl, and wherein $R^8$ is selected from the group consisting of optionally substituted C1 to C20 alkyl, optionally substituted C3 to C8 cycloalkyl, optionally substituted C2 to C20 alkenyl and optionally substituted C5 to C10 aryl, or
$X^4$, $Q^1$ and $Q^2$ denote independently of one another -$M^3 L^1_A$.

11. The composition of claim 10, wherein the metal silsesquioxane has the structural formula (V)

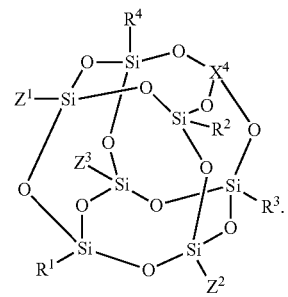

(V)

12. The composition of claim 10, wherein $M^1$, $M^2$, $M^3$ and $M^4$ are each independently selected from the group consisting of metals of the 1st, 2nd, 3rd, 4th, 5th, 8th, 10th and 11th subgroup and metals of the 1st, 2nd, 3rd, 4th and 5th main group.

13. The composition of claim 10, wherein $L^1$, $L^2$, $L^3$ and $L^4$ are each independently selected from —O—(C1 to C8 alkyl) and —O—(C1 to C6 alkyl).

14. The composition of claim 7, wherein the metal silsesquioxane has the structural formula (VI)

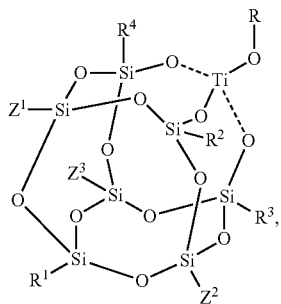

(VI)

wherein
titanium is linked to OR, wherein R is selected from the group consisting
of —H, -methyl, -ethyl, -propyl, -butyl, -octyl, -isopropyl, and -isobutyl, $Z^1$, $Z^2$ and $Z^3$ denote each independently of one another C1 to C20 alkyl, C3 to C8 cycloalkyl, C2 to C20 alkenyl or C5 to C10 aryl, and $R^1$, $R^2$, $R^3$ and $R^4$ denote each independently of one another C1 to C20 alkyl, C3 to C8 cycloalkyl, C2 to C20 alkenyl, or C5 to C10 aryl.

15. The composition of claim 14, wherein $Z^1$, $Z^2$, $Z^3$, $R^1$, $R^2$, $R^3$ and $R^4$ denote each independently of one another methyl, ethyl, propyl, isopropyl, butyl, isobutyl, hexyl, heptyl, octyl, vinyl, allyl, butenyl and phenyl, or benzyl.

16. The composition of claim 7, wherein the metal silsesquioxane has the structure (VII)

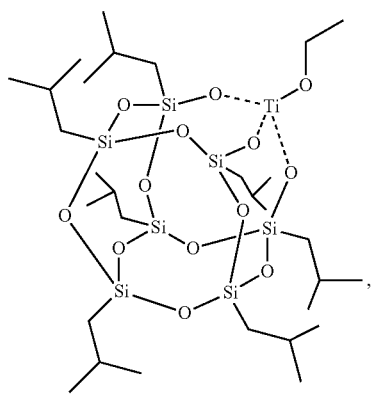

(VII)

wherein
each Si is linked to an isobutyl radical, and titanium carries an ethanolate ligand.

17. The composition of claim 7, wherein the oligomeric metal silsesquioxane is a polyhedral metal silsesquioxane.

18. The composition of claim 1, wherein in the silicone compound having the general formula HO—$(SiR^lR^mO)_o$—H, $R^l$ and $R^m$ denote independently of one another an optionally substituted, straight chain or branched C1 to C16 alkyl group, an optionally substituted, straight chain or branched C2 to C16 alkenyl group, or an optionally substituted C4 to C14 aryl group.

19. The composition of claim 18, wherein $R^l$ and $R^m$ denote independently of one another an optionally substituted, straight chain or branched C1 to C12 alkyl group, an optionally substituted, straight chain or branched C2 to C12 alkenyl group, or an optionally substituted C4 to C10 aryl group.

20. The composition of claim 1, wherein in the crosslinker having the general formula $Si(R)_m(R^a)_{4-m}$, each R denotes independently of one another an optionally substituted, straight chain or branched C1 to C12 alkyl group, or an optionally substituted, straight chain or branched C2 to C12 alkenyl group, or an optionally substituted C4 to C10 aryl group, each $R^a$ is selected independently of one another from the group consisting of
a hydroxycarboxylic acid ester radical having the general structural formula (I):

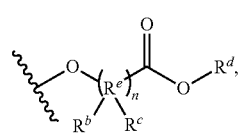

(I)

a hydroxycarboxylic acid amide radical having the general structural formula (II):

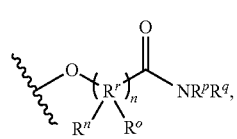

(II)

a carboxylic acid radical —O—C(O)—$R^f$,
an oxime radical —O—N=$CR^gR^h$,
a carboxylic acid amide radical —N—$(R^i)$—C(O)—$R^j$,
wherein
each $R^b$ and $R^c$ denotes independently of one another an optionally substituted, straight chain or branched C1 to C12 alkyl group, $R^d$ denotes an optionally substituted, straight chain or branched C1 to C12 alkyl group, a C4 to C10 cycloalkyl group, a C5 to C11 aralkyl group or a C4 to C10 aryl group, $R^e$ is a divalent benzene radical, or $R^e$ denotes C, and $R^b$ and $R^c$ denote H, or $R^e$ denotes C, and $R^b$ denotes H, and $R^c$ denotes methyl, n is an integer of from 1 to 5,
wherein
each $R^a$ and $R^o$ denotes independently of one another H or an optionally substituted, straight chain or branched C1 to C12 alkyl group, $R^p$ and $R^q$ denote independently of one another H or an optionally substituted, straight chain or branched C1 to C12 alkyl group, or an optionally substituted C4 to C14 cycloalkyl group or a C5 to C11 aralkyl group or a C4 to C10 aryl group, $R^r$ is a divalent benzene radical, or $R^r$ denotes C, and $R^n$ and $R^o$ denote H, or $R^r$ denotes C, and $R^n$ denotes H, and $R^o$ denotes methyl, p is an integer of from 1 to 5,
wherein
$R^f$ denotes H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group,
wherein
$R^g$ and $R^h$ denote independently of one another H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group,
and wherein
$R^i$ and $R^j$ denote independently of one another H or an optionally substituted, straight chain or branched C1 to C12 alkyl group, an optionally substituted C4 to C10 cycloalkyl group or an optionally substituted C4 to C10 aryl group or an optionally substituted C5 to C11 aralkyl group.

21. The composition of claim 20, wherein in the crosslinker having the general formula $Si(R)_m(R^a)_{4-m}$, each R denotes independently of one another an optionally substituted, straight chain or branched C1 to C8 alkyl group, an optionally substituted straight chain or branched C2 to C8 alkenyl group, or an optionally substituted C4 to C10 aryl group.

22. The composition of claim 20, wherein each $R^b$ and $R^c$ denotes independently of one another an optionally substituted, straight chain or branched C1 to C8 alkyl group.

23. The composition of claim 20, wherein $R^d$ denotes an optionally substituted, straight chain or branched C1 to C8 alkyl group, a C4 to C10 cycloalkyl group, a C5 to C11 aralkyl group or a C4 to C10 aryl group.

24. The composition of claim 20, wherein n and p are each independently an integer from 1 to 3.

25. A method for crosslinking a composition, wherein said method comprises contacting a composition with a catalyst, wherein said catalyst contains a metal siloxane-silanol(-ate) compound, and wherein said composition has been obtained by mixing a silicone compound having the general formula HO—$(SiR^iR^mO)_o$—H with a crosslinker having the general formula $Si(R)_m(R^a)_{4-m}$, wherein m and the radicals R and $R^a$, o and the radicals $R^l$ and $R^m$, and the catalyst, are all defined in accordance with claim 1.

26. The composition of claim 1, wherein the silicone compound having the general formula HO—$(SiR^iR^mO)_o$—H and the crosslinker having the general formula $Si(R)_m(R^a)_{4-m}$ is present in the form of a prepolymer, wherein the prepolymer is obtainable by reacting the silicone compound and the crosslinker having the general formula $Si(R)_m(R^a)_{4-m}$.

27. A method for preparing a composition, wherein said method comprises the following steps:
a. providing a composition containing
   i. at least one silicone compound having the general formula HO—$(SiR^iR^mO)_o$—H,
   ii. a catalyst, wherein the catalyst contains at least one metal siloxane-silanol(-ate) compound,
   iii. at least one crosslinker having the general formula $Si(R)_m(R^a)_{4-m}$,
b. mixing the composition, provided in a., using mechanical and/or thermal energy, wherein o and the radicals $R^l$ and $R^m$ in (i.), and m and the radicals R and $R^a$ in (iii.), are defined in accordance with claim 1.

28. A composition obtained by the method of claim 27.

29. A method for sealing materials obtained by curing a composition containing
i. at least one silicone compound having the general formula HO—$(SiR^iR^mO)_o$—H,
ii. a catalyst, wherein the catalyst contains at least one M3S compound, and
iii. at least one crosslinker having the general formula $Si(R)_m(R^a)_{4-m}$,
wherein o and the radicals $R^l$ and $R^m$ in (i.), and m and the radicals R and $R^a$ in (iii.), are defined in accordance with claim 1.

30. The composition of claim 1, wherein said composition is formulated as a sealant, adhesive material, potting compound, or a coating agent.

31. The composition of claim 1, wherein said at least one metal siloxane-silanol(-ate) compound comprises a metal selected from the group consisting of s and p block metals, d and f block transition metals, lanthanide and actinide metals and semimetals.

32. The composition of claim 1, wherein in said at least one crosslinker having the general formula $Si(R)_m(R^a)_{4-m}$, each R denotes independently of one another an optionally substituted, straight chain or branched C1 to C16 alkyl group, an optionally substituted, straight chain or branched C2 to C16 alkenyl group, or an optionally substituted C4 to C14 aryl group.

33. The composition of claim 1, wherein each $R^b$, $R^c$, $R^n$, $R^o$ denotes independently of one another H or an optionally substituted, straight chain or branched C1 to C16 alkyl group or an optionally substituted C4 to C14 aryl group.

34. The composition of claim 1, wherein $R^d$ denotes an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group.

35. The composition of claim 1, wherein $R^e$ and $R^r$ each independently denotes C or an optionally substituted saturated or partially unsaturated cyclic ring system having 4 to 14 C atoms or an optionally substituted aromatic group having 4 to 14 C atoms.

36. The composition of claim 1, wherein $R^p$ and $R^q$ denote independently of one another H or an optionally substituted, straight chain or branched C1 to C16 alkyl group, an optionally substituted C4 to C14 cycloalkyl group, an optionally substituted C5 to C15 aralkyl group or an optionally substituted C4 to C14 aryl group.

37. The composition of claim 1, wherein $R^f$, $R^g$, $R^h$, $R^i$ and $R^j$ denote independently of one another H or an optionally substituted, straight chain or branched C1 to C16 alkyl group, an optionally substituted C4 to C14 cycloalkyl group or an optionally substituted C4 to C14 aryl group or an optionally substituted C5 to C15 aralkyl group.

\* \* \* \* \*